United States Patent
Dormody et al.

(10) Patent No.: US 11,418,914 B2
(45) Date of Patent: Aug. 16, 2022

(54) CHARACTERIZING HEIGHT ABOVE TERRAIN CONFIDENCE

(71) Applicant: NextNav, LLC, Sunnyvale, CA (US)

(72) Inventors: Michael Dormody, San Jose, CA (US); Badrinath Nagarajan, South San Francisco, CA (US); Guiyuan Han, San Jose, CA (US); Arun Raghupathy, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 17/303,686

(22) Filed: Jun. 4, 2021

(65) Prior Publication Data

US 2021/0392457 A1    Dec. 16, 2021

Related U.S. Application Data

(60) Provisional application No. 63/037,890, filed on Jun. 11, 2020.

(51) Int. Cl.
*H04W 4/02* (2018.01)
*G01S 19/51* (2010.01)
*G01C 5/00* (2006.01)

(52) U.S. Cl.
CPC ............. *H04W 4/025* (2013.01); *G01C 5/00* (2013.01); *G01S 19/51* (2013.01)

(58) Field of Classification Search
CPC ........... H04W 4/025; G01C 5/00; G01S 19/51
See application file for complete search history.

(56) References Cited

U.S. PATENT DOCUMENTS

| | | |
|---|---|---|
| 6,298,287 B1 | 10/2001 | Tazartes et al. |
| 6,522,298 B1 | 2/2003 | Burgett et al. |
| 6,970,795 B1 | 11/2005 | Burgett et al. |
| 7,145,501 B1 | 12/2006 | Manfred et al. |
| 8,188,912 B1 | 5/2012 | Weisenburger |
| 8,949,025 B2 | 2/2015 | Garin |
| 10,848,911 B1 * | 11/2020 | Mallesan ............ H04W 4/33 |
| 2001/0047230 A1 | 11/2001 | Gremmert et al. |
| 2007/0239326 A1 | 10/2007 | Johnson et al. |
| 2009/0286556 A1 | 11/2009 | Yumoto et al. |
| 2010/0019938 A1 | 1/2010 | Bunch |
| 2010/0212421 A1 | 8/2010 | Young et al. |

(Continued)

FOREIGN PATENT DOCUMENTS

WO    WO-2019110118 A1 *   6/2019   ............. G01C 5/06

OTHER PUBLICATIONS

Li et al.; Using Barometers to Determine the Height for Indoor Positioning; 2013 Intl. Conf. on Indoor Positioning and Indoor Navigation; Oct. 28-31, 2013 (Year: 2013).*

(Continued)

*Primary Examiner* — Michael J Zanelli
(74) *Attorney, Agent, or Firm* — MLO, a professional corp.

(57) ABSTRACT

A method involves determining, at a mobile device or a service, an uncertainty in height above a reference altitude, an estimated 2D position of the mobile device, and an uncertainty in terrain height above the reference altitude using the estimated 2D position. An uncertainty in height above terrain, of the mobile device, is determined at the mobile device or a server using the uncertainty in height above the reference altitude and the uncertainty in terrain height above the reference altitude.

19 Claims, 16 Drawing Sheets

(56) References Cited

U.S. PATENT DOCUMENTS

| | | |
|---|---|---|
| 2012/0265373 A1 | 10/2012 | Ingvalson et al. |
| 2013/0204567 A1 | 8/2013 | Nieminen et al. |
| 2013/0325385 A1 | 12/2013 | Shin et al. |
| 2014/0092130 A1 | 4/2014 | Anderson et al. |
| 2014/0174175 A1 | 6/2014 | Chun et al. |
| 2015/0133145 A1 | 5/2015 | Palanki et al. |
| 2015/0281884 A1 | 10/2015 | Smith et al. |
| 2016/0047648 A1 | 2/2016 | Edge et al. |
| 2016/0245716 A1 | 8/2016 | Gum et al. |
| 2017/0039863 A1 | 2/2017 | Mashio et al. |
| 2017/0276483 A1 | 9/2017 | Dormody et al. |
| 2018/0003494 A1 | 1/2018 | Fleming |
| 2018/0073951 A1 | 3/2018 | Venkatraman et al. |
| 2018/0095059 A1 | 4/2018 | McQuillen et al. |

OTHER PUBLICATIONS

International Search Report dated Sep. 6, 2021 for PCT Patent Application No. PCT/IB2021/054932.
Form PCT/ISA/206, "Invitation to pay additional fees and, where applicable, protest fee", for PCT Patent Application No. PCT/US2017/049579, dated Nov. 9, 2017, 15 pages.
Sabatini and Genovese, A Stochastic Approach to Noise Modeling for Barometric Altimeters, Sensors, vol. 13, No. 11, Nov. 18, 2013, pp. 15692-15707.

\* cited by examiner

CHARACTERIZING HEIGHT ABOVE TERRAIN CONFIDENCE

CROSS-REFERENCE TO RELATED APPLICATIONS

This application claims priority to U.S. Provisional Patent Application No. 63/037,890, filed on Jun. 11, 2020, all of which is hereby incorporated herein by reference in its entirety.

BACKGROUND

Determining the exact location of a mobile device (e.g., a smartphone operated by a user) in an environment can be quite challenging, especially when the mobile device is located in an urban environment where locations may exist above terrain (e.g., within a building). Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity (e.g., −9.8 m/s²), R is a gas constant, and M is the molar mass of air (e.g., dry air or other). The minus sign (−) may be substituted with a plus sign (+) in alternative embodiments of Equation 1, as would be understood by one of ordinary skill in the art (e.g., g=9.8 m/s²). The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

In use, an altitude of a mobile device is often provided relative to a frame of reference. Typically, an altitude on Earth's surface is the height above ellipsoid (HAE) or above mean sea level (AMSL). However, these values are less useful for certain applications, such as measuring the floor level of a user in a building or providing some metric of the difficulty of a hiking path up a hill. Instead, altitude or height above terrain (HAT) is more useful. HAT may be provided as:

HAT=HAE−Terrain Height Above Ellipsoid  (Equation 3), or

HAT=AMSL−Terrain Height Above Mean Sea Level  (Equation 4).

The terrain heights above ellipsoid and above mean sea level can each generally be referred to as terrain height above reference, or "terrain" (T) for short. While HAT is a more user-friendly measurement, it is not a perfect measurement and is subject to error. Such error in HAT can be attributed to errors in HAE or AMSL, and/or in T.

SUMMARY

In some embodiments, a method involves determining, at a mobile device or a server, an uncertainty in height above a reference altitude. An estimated 2D position of the mobile device is determined at the mobile device or a server. An uncertainty in terrain height above the reference altitude using the estimated 2D position is determined at the mobile device or a server. An uncertainty in height above terrain of the mobile device is determined at the mobile device or at a server using the uncertainty in height above the reference altitude and the uncertainty in terrain height above the reference altitude.

In some embodiments, a method involves determining a first error value representative of an error associated with a pressure sensor of a mobile device. A second error value representative of an error associated with a reference pressure sensor is determined. An uncertainty in height above a reference altitude is determined using the first error value and the second error value. An estimated 2D position of the mobile device is determined at the mobile device or at a server. An uncertainty in terrain database accuracy of a terrain database using the estimated 2D position is determined at the mobile device or a server. An uncertainty in terrain flatness over a locus of possible 2D positions using the estimated 2D position is determined at the mobile device or a server. An uncertainty in terrain height above the reference altitude is determined, at the mobile device or a server, using the uncertainty in terrain database accuracy and the uncertainty in terrain measurement over the locus of possible 2D positions. An uncertainty in height above terrain of the mobile device is determined, at the mobile device or a server, using the uncertainty in height above the reference altitude and the uncertainty in terrain height above the reference altitude.

DETAILED DESCRIPTION

Figure 1:
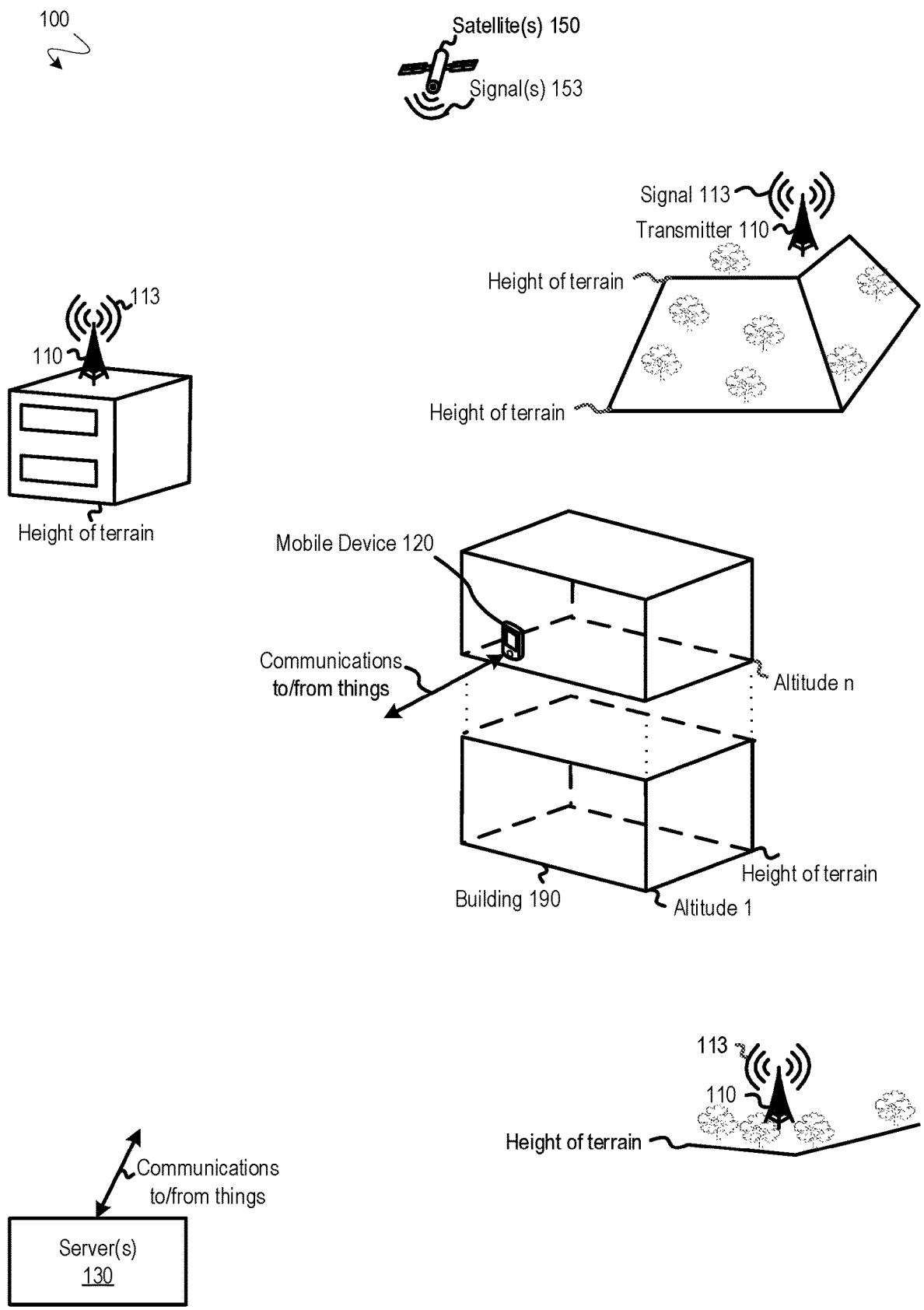
FIG. 1 depicts an operational environment in which systems and methods for characterizing height-above-terrain confidence may operate.
Figure 9:
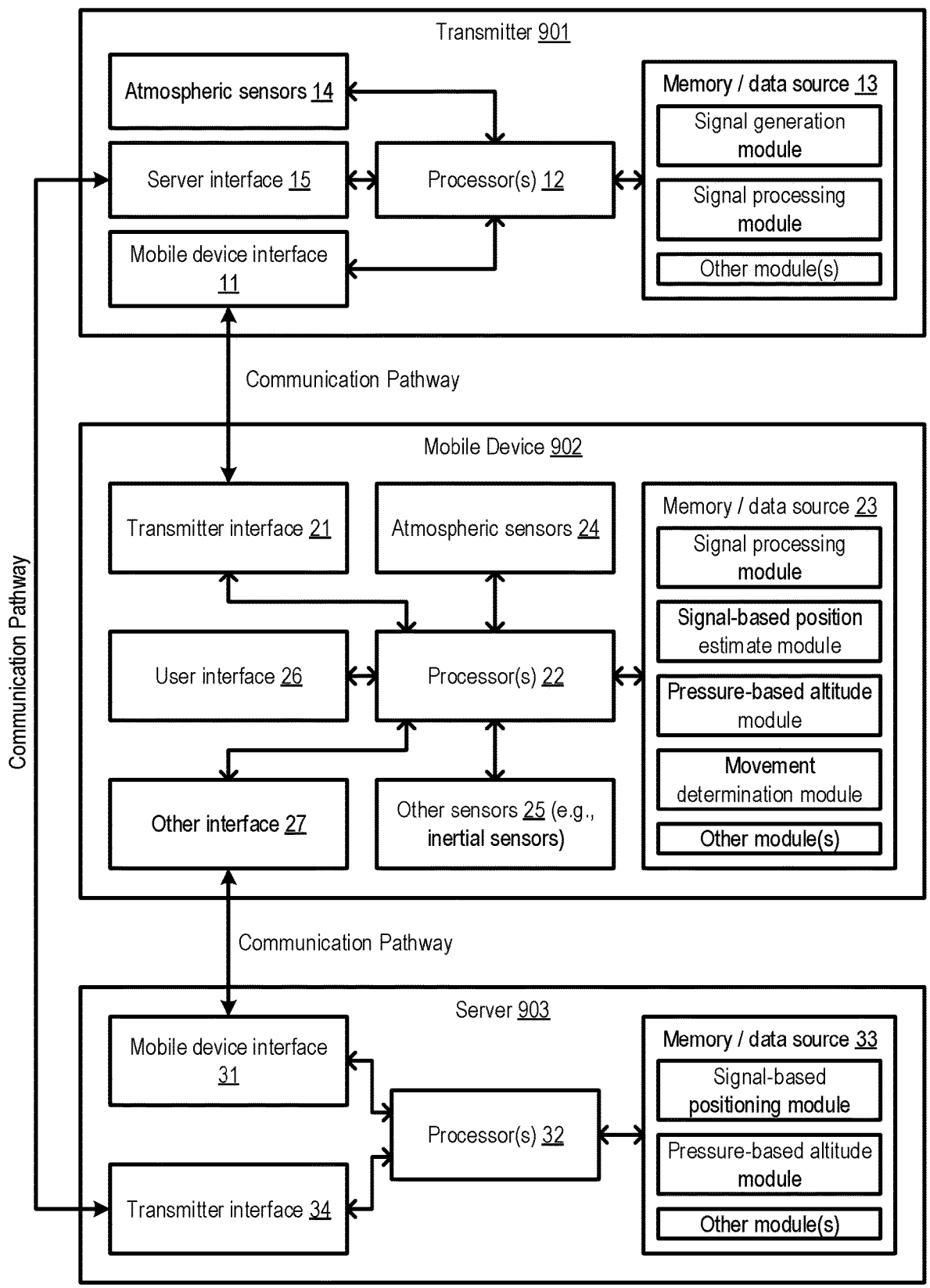
FIG. 9 illustrates components of a transmitter, a mobile device, and a server.

Systems and methods for characterizing height-above-terrain confidence are described below. Attention is initially drawn to an operational environment 100 illustrated in FIG. 1 in which systems and methods for characterizing height-above-terrain confidence may operate. As shown in FIG. 1, the environment 100 includes a network of terrestrial transmitters 110, at least one mobile device 120, and a server 130. Each of the transmitters 110 and the mobile device 120 may be located at different altitudes or depths that are inside or outside various natural or manmade structures (e.g., buildings) 190, relative to different terrain. Positioning signals 113 and 153 are respectively transmitted from the transmitters 110 and satellites 150 and are subsequently received by the mobile device 120 using known transmission technologies. For example, the transmitters 110 may transmit the signals 113 using one or more common multiplexing parameters that utilize time slots, pseudorandom sequences, frequency offsets, or other approaches, as is known in the art or otherwise disclosed herein. The mobile device 120 may take different forms, including a mobile phone or another wireless communication device, a portable computer, a navigation device, a tracking device, a receiver, or another suitable device that can receive the signals 113 and/or 153. Examples of possible components in the transmitters 110, the mobile device 120, and the server 130 are shown in FIG. 9 and discussed in the 'Other Aspects' section of this disclosure. In particular, each transmitter 110 and mobile device 120 may include atmospheric sensors (e.g., atmospheric pressure and temperature sensors) for generating measurements of atmospheric conditions (e.g., atmospheric pressure and temperature) that are used to estimate an unknown altitude of the mobile device 120.

As discussed in the Background section, an altitude of a mobile device is often provided relative to a frame of reference. Typically, an altitude on Earth's surface is described as height above ellipsoid (HAE) or above mean sea level (AMSL). However, these values are less useful for certain applications, such as measuring the floor level of a user in a building or some metric of the difficulty of a hiking path up a hill. Instead, altitude or height above terrain (HAT) is more useful. A measurement of HAT may be provided as:

$$\text{HAT} = \text{Height above Reference Altitude (RA)} - \text{Terrain Height Above Reference Altitude }(T) \quad \text{(Equation 3)},$$

where the Height above Reference Altitude (RA) is HAE, AMSL, or another reference altitude. In some embodiments, the height above reference altitude (RA) may refer to the height above a reference altitude of a mobile device, a fixed device, or another device that is operable to be used for altitude determination. Similarly, the height above terrain (HAT) may refer to the height above a terrain of a mobile device, a fixed device, or another device that is operable to be used for altitude determination. For example, the height above terrain (HAT) may refer to the height of a mobile device over a terrain. For ease of discussion, Terrain Height Above Reference Altitude (T) may be referred to as "terrain height" in this disclosure.

The HAT measurement may not reflect actual height over terrain because of errors in how the Height above Reference Altitude (RA) and/or Terrain Height Above Reference Altitude (T) are determined. In a 3D space, altitude or Z is an independent dimension uncorrelated with the other two dimensions X and Y. However, when an altitude is measured relative to another frame of reference such as terrain, the accuracy of the frame of reference is needed to properly characterize altitude error or confidence—e.g., if the frame of reference is a terrain surface that is only generally accurate to within N meters, then the altitude relative to that terrain surface can only be accurate to within no better than N meters. In addition, if latitude/longitude estimates of the position have errors and cannot be localized on the terrain surface to any better than M meters in an area that is not flat or lumpy (and such a measurement could be equally distributed around that lumpy area), then the altitude's worst-case error can exceed (N+M) meters. Therefore, it is advantageous to determine a HAT confidence that characterizes the quality of its own measurement, the other two spatial dimensions, and the quality of the underlying frame of reference in just one metric. One approach for advantageously determining a HAT confidence that propagates the error is as follows:

$$\Delta_{\text{HAT}} = \Delta \text{RA} + \Delta T \quad \text{(Equation 4)},$$

where the uncertainty in the measurement of HAT (i.e., ΔHAT) is defined as the sum of the uncertainty in height above a reference altitude (i.e., ΔRA), plus the uncertainty in terrain height above the reference altitude (i.e., ΔT). This error formulation can characterize worst-case error, which is useful for measuring the worst-case contributions from the underlying components. An alternative way to combine the components is to combine the individual variances in quadrature, which assumes the errors are uncorrelated, as follows:

$$(\Delta HAT)^2 = (\Delta RA)^2 + (\Delta T)^2 \quad \text{(Equation 5),}$$

or $$\Delta HAT = \sqrt{(\Delta RA)^2 + (\Delta T)^2} \quad \text{(Equation 6).}$$

HAT confidence is useful in characterizing the accuracy of a HAT measurement, which can be related or mapped to a building or manmade structure database (where heights are typically given as above terrain level or above floor level). By measuring the range of HAT values against a building or structure reference, measurements of HAT can be used for different applications, including for user context interpretation (e.g., Driving, Walking, Sitting, other).

In some embodiments, the uncertainty in height above a reference altitude ($\Delta RA$) may refer to an uncertainty in the height above a reference altitude of a mobile device, a fixed device, or another device that is operable to be used for altitude determination. Similarly, the uncertainty in height above terrain ($\Delta HAT$) may refer to the uncertainty in height above a terrain of a mobile device, a fixed device, or another device that is operable to be used for altitude determination. For example, the uncertainty in height above terrain ($\Delta HAT$) may refer to an uncertainty in the height of a mobile device over a terrain.

The uncertainty in height above a reference altitude (i.e., $\Delta RA$) may be determined in different ways. One method is described in U.S. patent Ser. No. 10/655,961, issued 19 May 2020, and entitled SYSTEMS AND METHODS FOR DETERMINING AN ALTITUDE ERROR VALUE ASSOCIATED WITH AN ESTIMATED ALTITUDE OF A MOBILE DEVICE, which characterizes uncertainty in a pressure-based altitude measurement by measuring the uncertainty in two terms (e.g., pressure from the mobile device and pressure from the reference network) and plugging those terms into a formula. Examples of uncertainty in the pressure from the mobile device include any, or all, of the following: uncertainty in pressure sensor noise; pressurization in the vicinity of the mobile device; and/or the sensor calibration uncertainty. Examples of uncertainty in the pressure from the reference network include any, or all, of the following: uncertainty in a reference pressure sensor's calibration; and/or a pressure gradient between the mobile device's location and the reference pressure sensor location.

As but one example, uncertainty in height above a reference altitude ($\Delta RA$) can be determined by i) determining a first error value (e.g., a systematic error value based on drift of a local pressure sensor of the mobile device, pressurization inside a building that houses the mobile device, and/or an estimated distance separating the mobile device and a reference pressure sensor); ii) determining a second error value (e.g., a statistical error value based on a measurement of pressure from the local pressor sensor, a measurement of pressure from the reference pressor sensor, a measurement of temperature from a reference temperature sensor, a first value of measurement error associated with the reference pressure sensor, and a second value of measurement error associated with the local pressure sensor), and iii) determining the uncertainty in height above a reference altitude ($\Delta RA$) using the first error value and the second error value.

As but one example, determining the uncertainty in height above a reference altitude ($\Delta RA$) using the first error value and the second error value can be determined by i) computing a square of the first error value; ii) computing a square of the second error value; iii) and computing a square root of a sum of the square of the first error value and the square of the second error value.

The uncertainty in terrain height above the reference altitude (i.e., $\Delta T$) may be considered in view of three components:

1. The overall accuracy of a terrain database that stores altitudes, heights, or elevations of terrain and from which terrain altitude/height/elevation can be retrieved, including the accuracy of terrain located underneath a building. Embodiments for determining this measurement are described below in this disclosure. Though terrain altitude is used in many of the embodiments disclosed herein, it is understood that terrain height or elevation may be used instead.

Figure 2A:
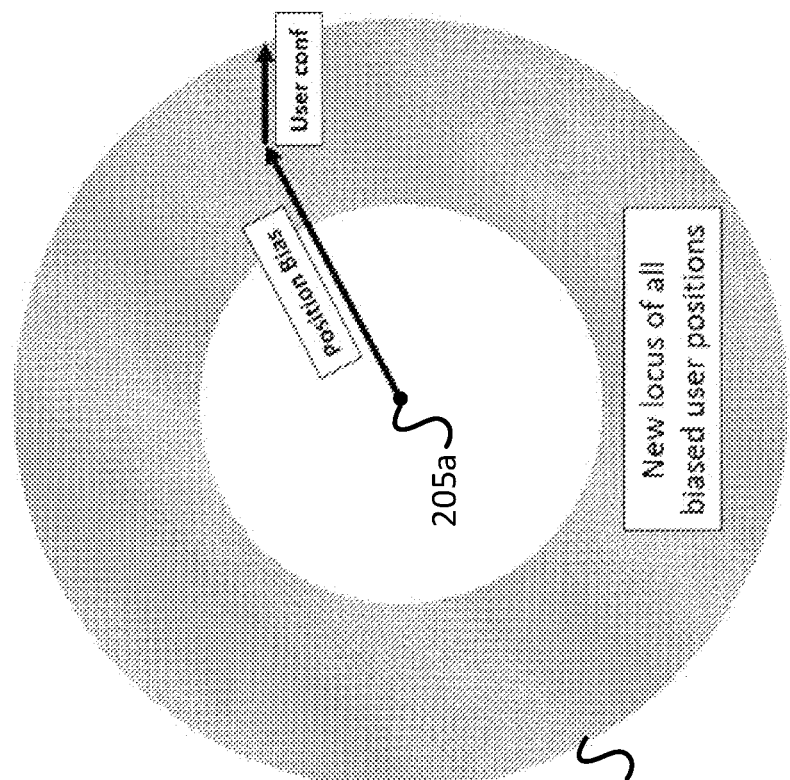
FIG. 2A and FIG. 2B each illustrate possible positions for a given position and confidence, in accordance with some embodiments.
Figure 2A:
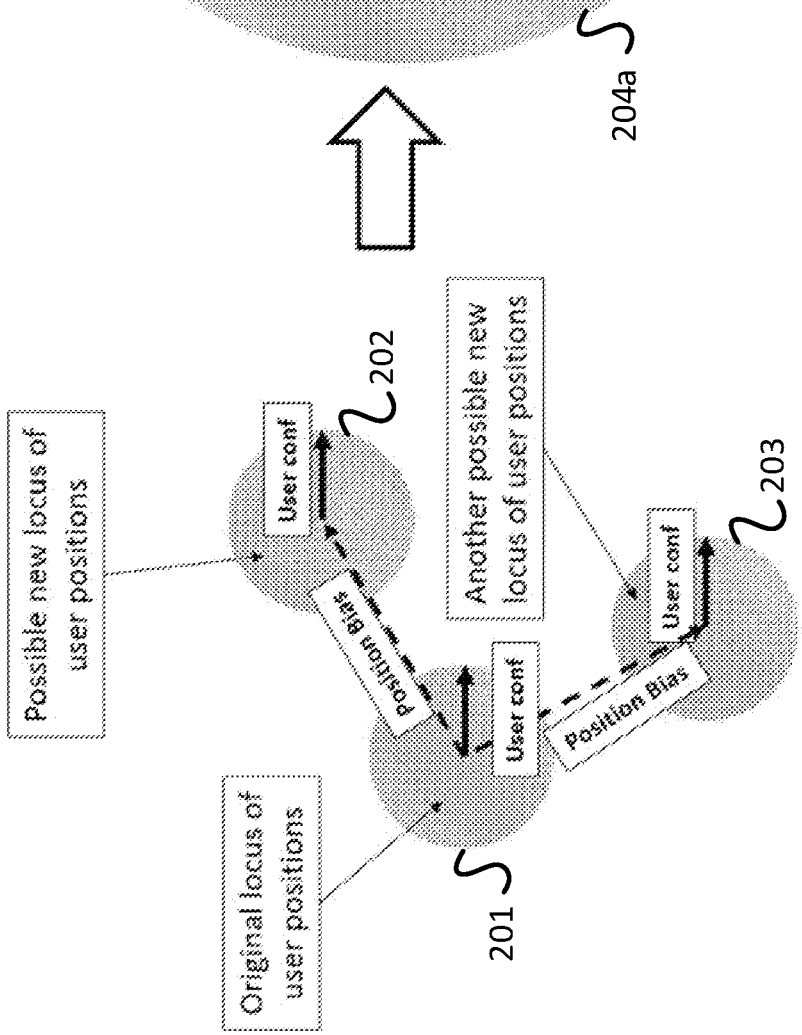
Figure 2B:
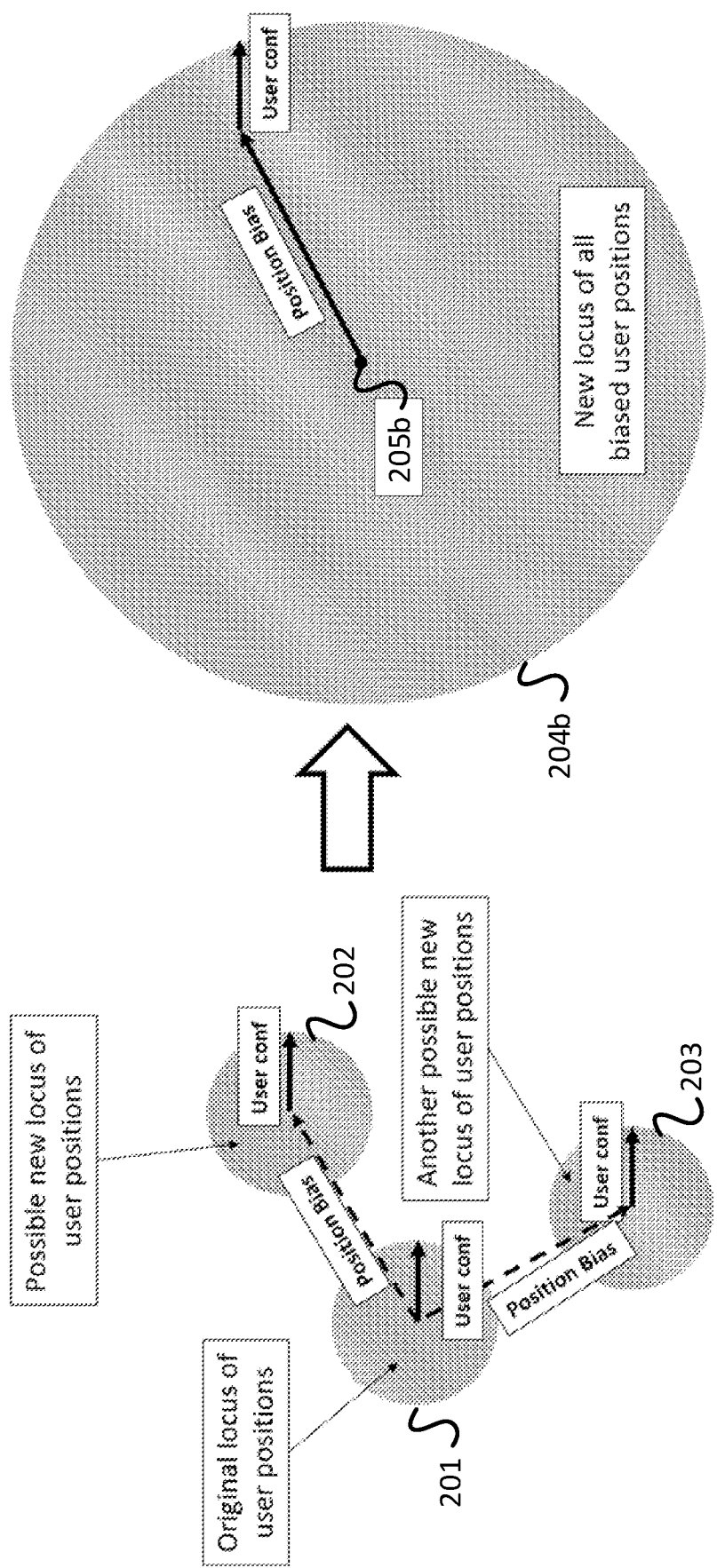

2. Possible two-dimensional ("2D") positions in latitude and longitude at which a mobile device may be located, which are based on the accuracy and confidence of a 2D position estimate for use in looking up terrain height corresponding to the possible 2D positions. In some embodiments:

a. The accuracy is known as the position bias and may be determined in different ways. In one embodiment, the position bias is retrieved from a database of measured or modeled position biases for specific buildings or morphologies based on previously collected data, where the retrieved position bias for a specific building or morphology is identified instead of other position biases for other buildings or morphologies by (i) matching an underlying property of the specific building (e.g., location relative to urban morphology, number of floors, neighboring tall buildings, etc.) to a similar building (i.e., with the same or similar underlying property), and then retrieving a measured position bias of that similar building, or (ii) matching an underlying property of the specific building to a previously measured position bias collected in the specific building for that underlying property. Alternatively, if the position bias is determined to be strongly correlated with some variables that characterize building properties (e.g., building height, building material), then the position bias could be modeled using a regression model to predict performance from similar buildings. Such a regression model would store model coefficients and be retrieved when the model was queried. In either preceding example, if the bias and direction of the bias were known a priori, then an initial estimate of 2D location can be translated to an updated position by adjusting the initial estimate in the direction and by the amount of the bias. Otherwise, when the direction is uncertain, the bias can be used to determine an initial locus of potential 2D positions, such as a ring centered on the initial 2D position estimate with an inner radius equal to the position bias minus the confidence and an outer radius equal to the position bias plus the confidence.

b. The confidence can be determined by positioning technology included in the mobile device, including GNSS/WiFi/MBS, etc., and is usually returned alongside a 2D position as a measurement of the confidence in the position. The measurement of the confidence in the position is smaller in magnitude if the 2D position is well-localized and larger in magnitude if the 2D position is poorly localized.

c. The position bias and the confidence can be combined into one term that defines a locus of possible 2D positions at which the mobile device may be located. Since the direction of any position bias may be unknown, all possible biases can be modeled as a circle centered on the initial 2D position estimate with a new confidence that is the sum of the initial confidence and the position bias. By way of example, FIG. 2A and FIG. 2B provide a visual sketch of the possible positions for a given position and confidence if the directional bias is unknown, in accordance with some embodiments. In FIG. 2A, the possible mobile device positions 201-203 can be defined as a ring 204a centered at the initial 2D position estimate 205a with an inner radius of a difference between bias and confidence and an outer radius equal to a sum of bias and confidence. In FIG. 2B, the possible mobile device positions 201-203 can be defined as a circle 204b centered at the initial 2D position estimate 205b with a radius equal to a sum of bias and confidence. The locus in FIG. 2A is preferred if the position bias is consistent and the locus in FIG. 2B is preferred if the position bias is less well-defined such as when it is a range of values. The position bias is consistent or well-defined if repeated measurements at the same location across different times yield a calculated/measured position that is within a threshold spread (e.g., all measurements are within 10 m of each other) and are within a threshold distance (e.g., all measurements are 95-105 m from the true location). A position bias is less well-defined if it is not well-defined as described previously, meaning the calculated/measured position is not within a threshold spread (e.g., all measurements are not within 10 m of each other, or not all measurements are within 10 m of each other) or are not within a threshold distance (e.g., all measurements are not 95-105 m from the true location, or not all measurements are 95-105 m from the true location).

3. Variation, or "flatness", of terrain over the locus of possible 2D positions at which the mobile device may be located from above.

Two components, uncertainty in terrain database accuracy, $\Delta T_{accuracy}$, and uncertainty in terrain measurement over a locus of possible 2D positions, or the "flatness" of the mobile device's position, $\Delta T_{flatness}$, are determined as shown below. These components may be treated as uncorrelated and can be added in quadrature:

$$\Delta T = \sqrt{(\Delta T_{accuracy})^2 + (\Delta T_{flatness})^2} \quad \text{(Equation 7)}.$$

In some embodiments, to allow for weighting of one metric over another, Equation 7 is modified with parameters A, B, and C, as shown below, to align with field data:

$$\Delta T = A + \sqrt{B \times (\Delta T_{accuracy})^2 + C \times (\Delta T_{flatness})^2} \quad \text{(Equation 8)}.$$

The terms A, B, and C are used to match the measured terrain confidence (e.g., measured difference between true surveyed terrain and terrain database) with the expected terrain confidence from the formula in equation 8. Data is collected across a variety of locations and terrains, and that data is used to fit for the best A, B, and C parameters, using a least-squares fit, or other regression strategy, for example. The term A is an overall offset to the formula and can model the overall confidence of the terrain uncertainty in excess of the individual components. In other words, the term A describes the base uncertainty if it cannot be fully explained by the individual component confidence. The term B is a scaling factor that can work in conjunction with C to demonstrate the individual weight of the $\Delta T_{accuracy}$ component based on collected or modeled data. The term C is a scaling factor that can work in conjunction with B to demonstrate the individual weight of the $\Delta T_{flatness}$ component based on collected or modeled data.

The $\Delta T_{accuracy}$ component can be derived from any of the following approaches, in accordance with some embodiments:

1. Grid resolution of the terrain database. For example, if the terrain is gridded to 30-meter-by-30-meter tiles and the mobile device is at the edge of a tile, then the terrain data at the mobile device's position could be inaccurate. The terrain database's error can be estimated by interpolating altitude values between tiles, measuring the difference between the tile altitude value and the interpolated altitude value, and characterizing the typical altitude error of being X meters (2D distance) from the center of the grid as some error Y m (in height). By way of example, FIG. 7A (discussed below) depicts a process for determining estimated gridding error.
2. Artifacts left by data processing of surface models to remove manmade structures such as buildings, bridges, overpasses, etc. The component can be estimated by evaluating terrain altitude differences across the boundary of a structure footprint taken from a building database. If the altitude difference is beyond a certain threshold, then the terrain within the footprint can be flagged as being suspect (i.e., potentially incorrect, not to be relied upon, or given less weight in subsequent calculations or determinations) and thereby increase the magnitude of the confidence interval. By way of example, FIG. 7B (discussed below) depicts a process for determining estimated manmade structure removal artifact error.
3. Alternatively, artifact error can be estimated by interpolating altitude over tile boundaries, measuring the altitude differences between the terrain altitude value and the interpolated altitude value, and characterizing the typical altitude error of being within a building as some error Z meters (in height). For a building that is located on sloped terrain, the terrain response to a query from inside that building may describe the ground level or first floor (as if the building were excised), or it may describe the underlying terrain (as if the building did not exist at all). For the former option, height above terrain would remain fairly constant as the user walked around the entire floor footprint. However, for the latter option, height above terrain may vary considerably as the user walked around the entire floor footprint since underlying terrain would be changing despite the user's HAE or AMSL value remaining constant. If the terrain option were unknown, then the worst case would be considered (latter option) and the underlying slope of the building's terrain would need to be accounted for in the confidence. By way of example, FIG. 7C (discussed below) depicts another process for determining estimated manmade structure removal artifact error.
4. Database accuracy determined from a published specifications sheet, as accessed from an online source.
5. Database accuracy determined from comparing known GPS benchmarks to the corresponding terrain database entry and calculating the variance of the difference between altitude of the two, or measuring the cumulative distribution function (CDF) of the altitude difference between the two and determining the corresponding relevant percentages (e.g., 50%, 68%, 95%). By way of example, FIG. 7D (discussed below) depicts such a process for measuring the accuracy of a terrain database.

6. Database accuracy determined by comparing known ground control points (e.g., points on the surface of the earth of known location, such as those used to geo-reference Landsat Level-1 imagery) to the corresponding terrain database entry and calculating the variance of the difference in altitude between the two, or measuring the cumulative distribution function (CDF) of the altitude differences between the two and determining the corresponding relevant percentages (e.g., 50%, 68%, 95%). By way of example, FIG. 7E (discussed below) depicts another process for measuring the accuracy of the terrain database.

The $\Delta T_{flatness}$ component can be calculated in different ways, including as described in U.S. Pub No. 20190360804, published 28 Nov. 2019 as U.S. Pub No. 20190360804, entitled SYSTEMS AND METHODS FOR DETERMINING WHEN AN ESTIMATED ALTITUDE OF A MOBILE DEVICE CAN BE USED FOR CALIBRATION OR LOCATION DETERMINATION. In general, the $T_{flatness}$ component can be calculated such that altitudes of terrain tiles falling within a determined set of possible 2D positions of the mobile device are collected, the mobile device's center altitude is subtracted, and the variance of this distribution is calculated. Alternatively, the CDF of the distribution can be calculated and compared against a different percentage threshold (i.e., 80%, 90%, 95%) to fine-tune the percentage of interest.

One example of a process for determining the $T_{flatness}$ component includes the following steps for a given 2D position and its corresponding 2D confidence: measure the terrain altitude value at the 2D position; measure all terrain altitude values falling within a confidence polygon or a circle; subtract the terrain altitude value at the 2D position from all altitude points falling within the confidence polygon or circle, and determine the absolute value of the distribution; and calculate an appropriate statistical metric of the distribution (e.g., 1 sigma value, 2 sigma value, 80%, etc.) using known techniques, such as those from U.S. Pub No. 20190360804, published 28 Nov. 2019 as U.S. Pub No. 20190360804, entitled SYSTEMS AND METHODS FOR DETERMINING WHEN AN ESTIMATED ALTITUDE OF A MOBILE DEVICE CAN BE USED FOR CALIBRATION OR LOCATION DETERMINATION.

The final height-above-terrain confidence is therefore:

$$\Delta HAT = \Delta RA + A + \sqrt{B \times (\Delta T_{accuracy})^2 + C \times (\Delta T_{flatness})^2} \quad \text{(Equation 9)}$$

or $$\Delta HAT = \sqrt{(\Delta RA)^2 + \left(A + \sqrt{(\Delta T_{accuracy})^2 + C \times (\Delta T_{flatness})^2}\right)^2}. \quad \text{(Equation 10)}$$

Processes for Characterizing Height-Above-Terrain Confidence

Figure 3:
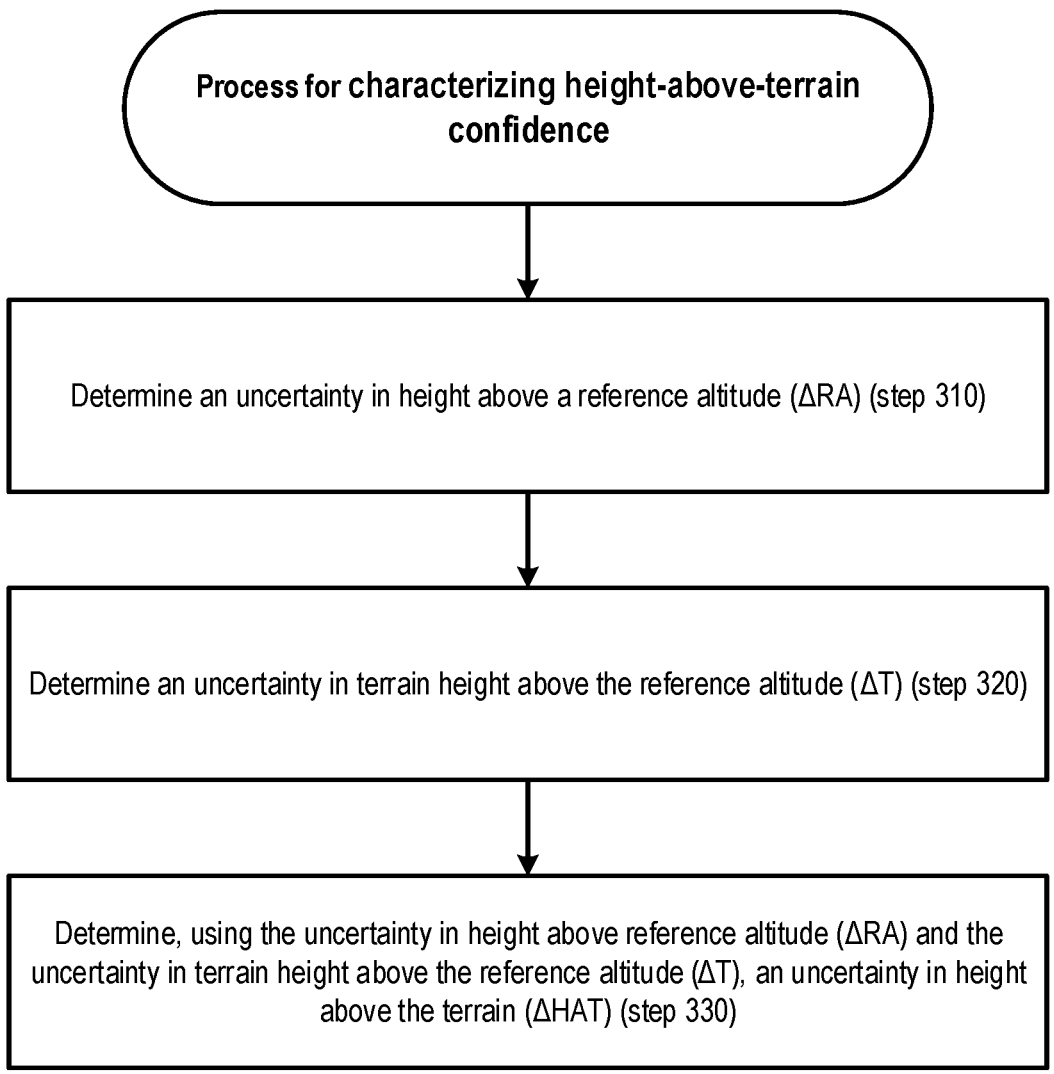
FIG. 3 depicts a process for characterizing height-above-terrain confidence, in accordance with some embodiments.

A process for characterizing height-above-terrain confidence, in accordance with some embodiments, is shown in FIG. 3, which includes the following steps:
  a. Determining an uncertainty in height above a reference altitude ($\Delta RA$) (step 310);
  b. Determining an uncertainty in terrain height above the reference altitude ($\Delta T$) (step 320); and
  c. Determining, using the uncertainty in height above a reference altitude ($\Delta RA$) and the uncertainty in terrain height above the reference altitude ($\Delta T$), an uncertainty in height above the terrain ($\Delta HAT$) (step 330).

Embodiments of step 310 include: methods described in U.S. Pat. No. 10,655,961, issued 19 May 2020, and entitled SYSTEMS AND METHODS FOR DETERMINING AN ALTITUDE ERROR VALUE ASSOCIATED WITH AN ESTIMATED ALTITUDE OF A MOBILE DEVICE, which characterizes uncertainty in a pressure-based altitude measurement by measuring the uncertainty in two terms (e.g., pressure from the mobile device and pressure from the reference network) and plugging those terms into a formula. Examples of uncertainty in the pressure from the mobile device include any, or all, of the following: uncertainty in pressure sensor noise; pressurization in the vicinity of the mobile device; and/or the sensor calibration uncertainty. Examples of uncertainty in the pressure from the reference network include any or all of the following: uncertainty in a reference pressure sensor's calibration; and/or pressure gradient between the mobile device's location and the reference pressure sensor location.

One embodiment of step 320 is discussed below with reference to FIG. 4. Other embodiments of step 320 are discussed in the preceding section above.

Different embodiments of step 330 are discussed below with reference to FIG. 5A, FIG. 5B, FIG. 6A and FIG. 6B. Other embodiments of step 330 are discussed in the preceding section above.

By way of example, a system with one or more components for performing (e.g., that perform, or are configured, adapted, or operable to perform) different steps of the process depicted in FIG. 3 includes the following: Step 310 (e.g., for altitude uncertainty, measurements collected by instruments from a reference network, saved to a storage medium, and then transferred to a server and saved in a database/storage; measurements collected from the mobile device and saved to its internal storage or external storage; and to calculate the uncertainty in the altitude reading, the measurements are combined into a formula, which can happen on the mobile device or on a server, which is then stored and made available to the mobile device); Step 320 (for terrain database accuracy, the process by which the terrain database accuracy is calculated can be performed on a computer or server that is capable of performing calculations, and the terrain database itself is stored in a database on the computer or server; for terrain flatness, the process by which the "flatness" is measured can be performed on a mobile device that pulls down appropriate terrain data/tiles and performs the calculation, or the position and confidence can be sent to a server that houses the terrain database, and the calculation can be performed on the server); and Step 330 (the combination of steps 310 and 320 to derive step 330 can be performed on the mobile device, a computer, or a server that can perform calculations).

As noted above, FIG. 4 depicts a process for determining an uncertainty in height of terrain above a reference altitude, in accordance with some embodiments. As shown, the process for determining an uncertainty in height of terrain above a reference altitude includes the following steps:

a. Determining an uncertainty of terrain database accuracy, $\Delta T_{accuracy}$ (step 421);

b. Determining an uncertainty in terrain measurement over a locus of possible 2D positions (e.g., a flatness of the mobile device's position on the terrain), $\Delta T_{flatness}$ (step 422);

c. Identifying a first parameter (A) representing an offset that models a base uncertainty confidence of terrain uncertainty in excess of uncertainty in terrain database accuracy and uncertainty in terrain measurement over a locus of possible 2D positions, a second parameter (B) representing a first scaling factor for weighting a term derived from the uncertainty in terrain database accuracy, and a third parameter (C) representing a second scaling factor for weighting a term derived from the uncertainty in terrain measurement over a locus of possible 2D positions (step 423);

d. Determining a product of the second parameter and a square of the uncertainty of terrain database accuracy, $B \times (\Delta T_{accuracy})^2$ (step 424);

e. Determining a product of the third parameter and a square of the uncertainty in terrain measurement over a locus of possible 2D positions, $C \times (\Delta T_{flatness})^2$ (step 425);

f. Determining a sum of (i) the product of the second parameter and a square of the uncertainty of terrain database accuracy and (ii) the product of the third parameter and a square of the uncertainty in terrain measurement over a locus of possible 2D positions, $B \times (\Delta T_{accuracy})^2 + C \times (\Delta T_{flatness})^2$ (step 426); and g. Determining, as the uncertainty in terrain height above the reference altitude ($\Delta T$), a sum of the first parameter and a square root of the sum of (i) the product of the second parameter and a square of the uncertainty of terrain database accuracy and (ii) the product of the third parameter and a square of the uncertainty in terrain measurement over a locus of possible 2D positions, $A + \sqrt{(B \times (\Delta T_{accuracy})^2 + C \times (\Delta T_{flatness})^2)}$ (step 427).

Figure 4:
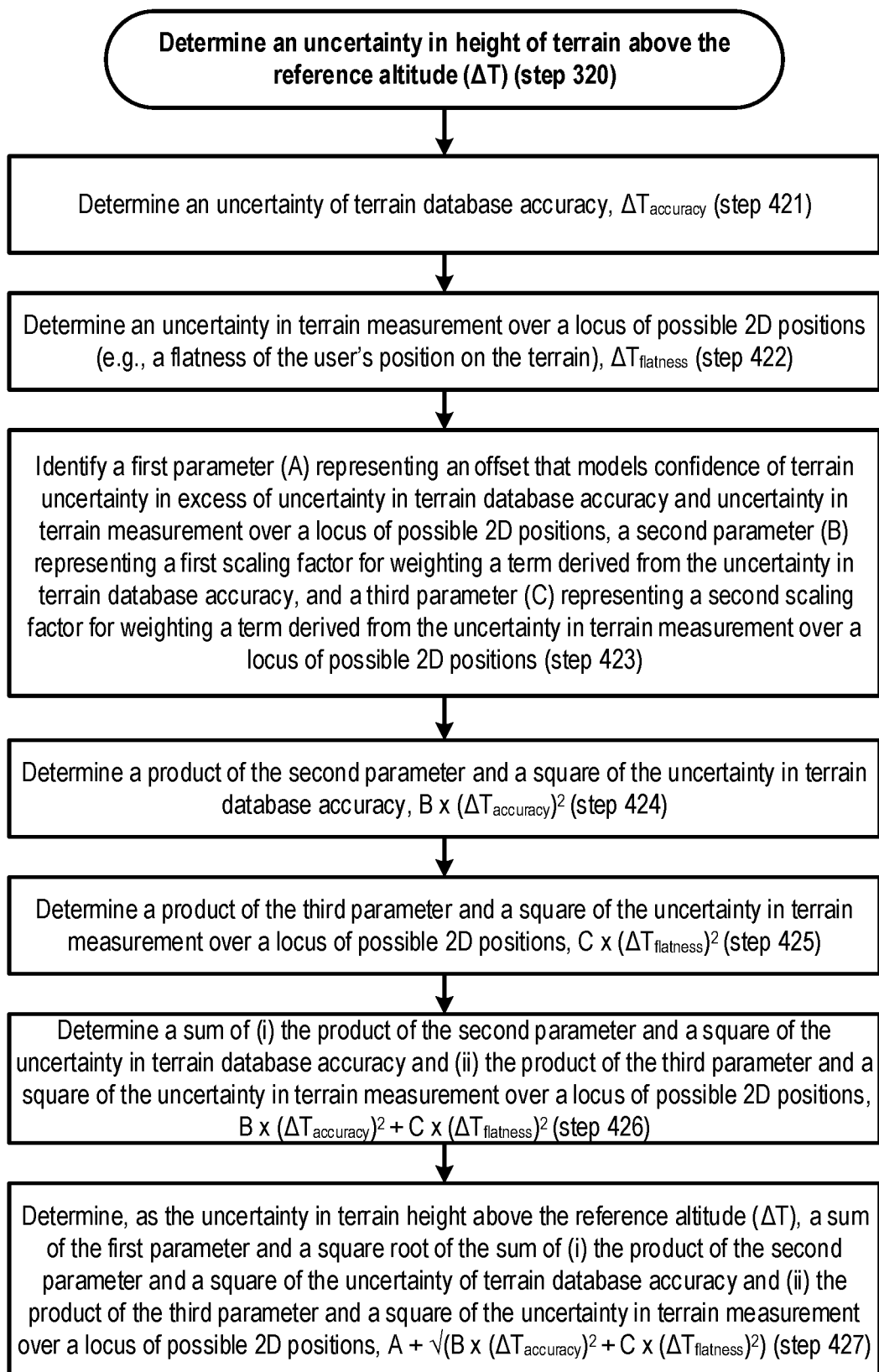
FIG. 4 depicts a process for determining an uncertainty in height of terrain above a reference altitude, in accordance with some embodiments.

By way of example, a system with one or more components for performing (e.g., that perform, or are configured, adapted or operable to perform) different steps of the process depicted in FIG. 4 includes the following, in accordance with some embodiments: Step 421 (for terrain database accuracy, the process by which the terrain database accuracy is calculated can be performed on a computer or a server that is capable of performing calculations, and the terrain database itself is stored in a database on the computer or the server); Step 422 (for terrain flatness, the process by which the "flatness" is measured can be performed on the mobile device that pulls down the appropriate terrain data/tiles and performs the calculation, or the position and confidence can be sent to a server that houses the terrain database, and the calculation can be performed on the server); and Step 423 (identifying parameters that represent base uncertainty and scale factors can be performed on a computer with the parameters stored in a database or storage medium). In some embodiments A, B and C are determined by performing a linear or non-linear fit, such as a least-squares fit using data collected across a variety of locations and terrains, and that data is used to fit for the best values of A, B, and C.

Steps 424-427: these calculations can be performed on a phone or a server, as long as the measurements are available, and the parameters/coefficients are available to the phone or server.

Different embodiments of step 421 are discussed below with reference to FIG. 7A through FIG. 7E. Other embodiments of step 421 are discussed in the preceding section above. Different embodiments of step 422 are discussed below with reference to FIG. 8. Other embodiments of step 422 are discussed in the preceding section above.

As noted above, FIG. 5A and FIG. 5B each depict a different process for determining, using an uncertainty in height above a reference altitude ($\Delta RA$) and an uncertainty in terrain height above the reference altitude ($\Delta T$), an uncertainty in height above the terrain.

Figure 5A:
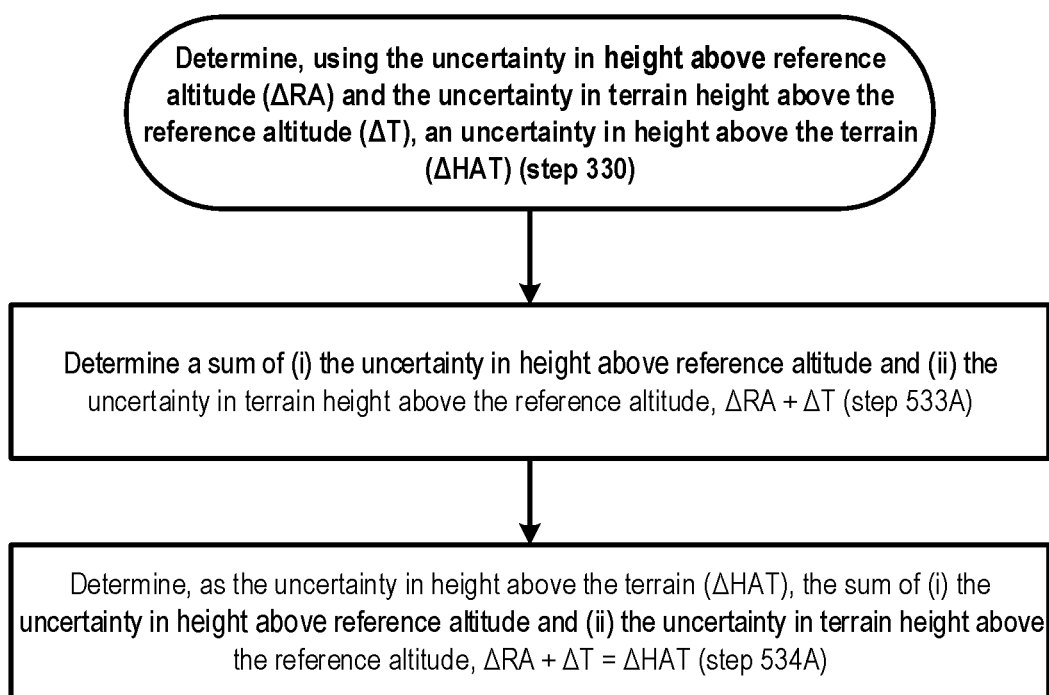
FIG. 5A and FIG. 5B each depict a different process for determining an uncertainty in height above terrain using an uncertainty in height above a reference altitude and an uncertainty in terrain height above the reference altitude, in accordance with some embodiments.

The process shown in FIG. 5A for determining, using an uncertainty in reference altitude and an uncertainty in terrain height above the reference altitude, an uncertainty in height above the terrain includes the following steps:

a. Determining a sum of (i) the height above reference altitude and (ii) the height of terrain above the reference altitude, $\Delta RA + \Delta T$ (step 533A); and b. Determining, as the uncertainty in height above the terrain ($\Delta HAT$), the sum of (i) the height above reference altitude and (ii) the height of terrain above the reference altitude, $\Delta RA + \Delta T = \Delta HAT$ (step 534A).

By way of example, a system with one or more components for performing (e.g., that perform, or are configured, adapted, or operable to perform) different steps of the processes depicted in FIG. 5A, in accordance with some embodiments, includes the following: Steps 533A and 534A (performed on the mobile device, a computer or a server, where $\Delta RA$ and $\Delta T$ are available to the mobile device, computer, or server and stored in a database or on a storage device).

Figure 5B:
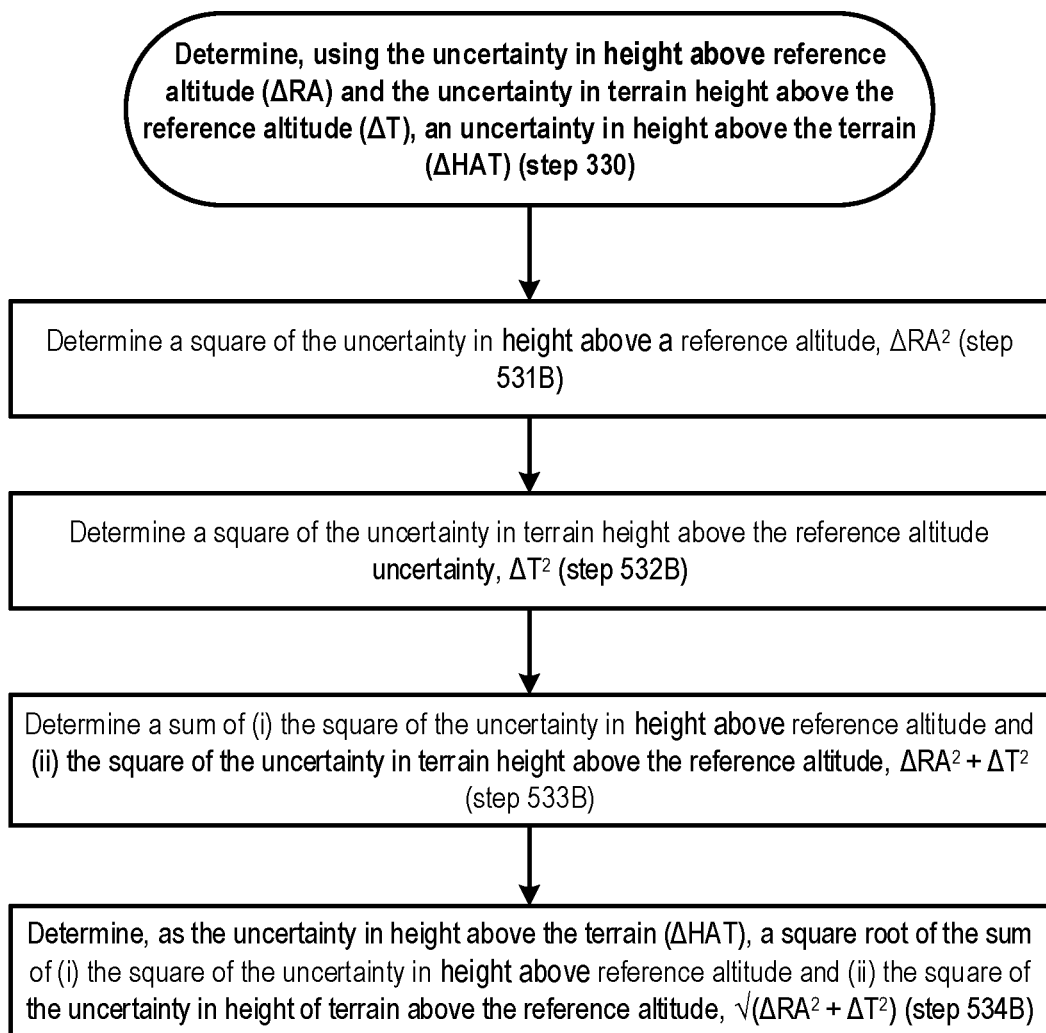

The process shown in FIG. 5B for determining, using an uncertainty in height above a reference altitude ($\Delta RA$) and an uncertainty in terrain height above the reference altitude ($\Delta T$), an uncertainty in height above the terrain includes the following steps:

a. Determining a square of the uncertainty in height above a reference altitude, $\Delta RA^2$ (step 531B);

b. Determining a square of the uncertainty in terrain height above the reference altitude, $\Delta T^2$ (step 532B);

c. Determining a sum of (i) the square of the uncertainty in height above a reference altitude ($\Delta RA$) and (ii) the square of the uncertainty in terrain height above the reference altitude ($\Delta T$), $\Delta RA^2 + \Delta T^2$ (step 533B); and d. Determining, as the uncertainty in height above the terrain ($\Delta HAT$), a square root of the sum of (i) the square of the uncertainty in height above a reference altitude ($\Delta RA$) and (ii) the square of the uncertainty in terrain height above the reference altitude ($\Delta T$), $\sqrt{(\Delta RA^2 + \Delta T^2)}$ (step 534B).

By way of example, a system with one or more components for performing (e.g., that perform, or are configured, adapted, or operable to perform) different steps of the processes depicted in FIG. 5B, in accordance with some embodiments, includes the following: Steps 531B through 534B (performed on the mobile device, a computer, or a server, where $\Delta RA$ and $\Delta T$ are available to the mobile device, computer, or server and stored in a database or on a storage device).

As noted above, FIG. 6A and FIG. 6B each depict a different process for determining, using an uncertainty in height above a reference altitude and an uncertainty in terrain height above the reference altitude, an uncertainty in height above the terrain, in accordance with some embodiments. In each of FIG. 6A and FIG. 6B, the uncertainty in terrain height above the reference altitude ($\Delta T$) is determined using the process of FIG. 4—e.g., the uncertainty in terrain height above the reference altitude (ΔT) is the sum of the first parameter and the square root of the sum of (i) the product of the second parameter and the square of the uncertainty of terrain database accuracy and (ii) the product of the third parameter and a square of the uncertainty of flatness over the biased locus, $A+\sqrt{(B\times(\Delta T_{accuracy})^2+C\times(\Delta T_{flatness})^2)}$ (from step 427).

Figure 6A:
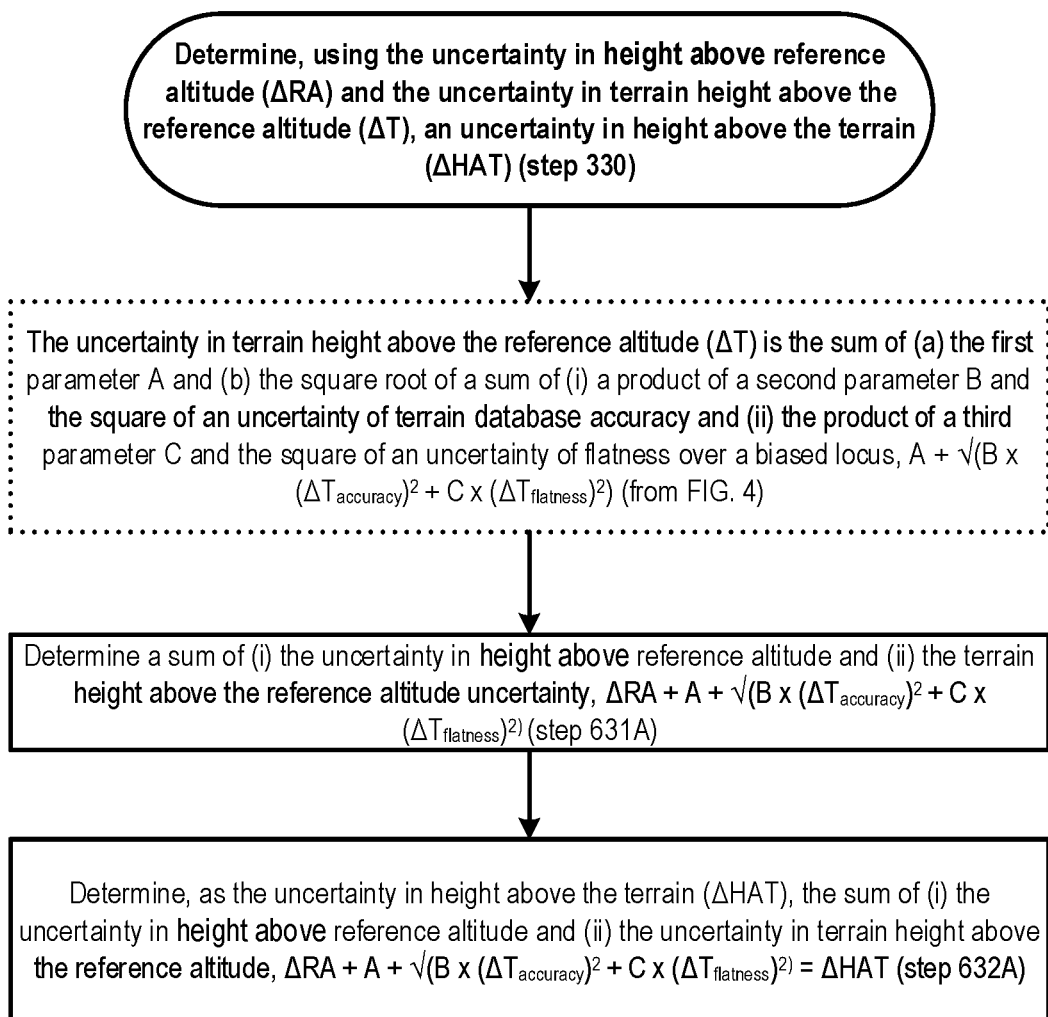
FIG. 6A and FIG. 6B each depict a different process for determining an uncertainty in height above the terrain using an uncertainty in height above a reference altitude and an uncertainty in terrain height above the reference altitude, in accordance with some embodiments.

The process shown in FIG. 6A for determining, using an uncertainty in height above a reference altitude (ΔRA) and an uncertainty in terrain height above the reference altitude (ΔT), an uncertainty in height above the terrain, in accordance with some embodiments, includes the following steps:

a. Determining a sum of (i) the uncertainty in height above a reference altitude ΔRA and (ii) the uncertainty in terrain height above the reference altitude, $\Delta RA+A+\sqrt{(B\times(\Delta T_{accuracy})^2+C\times(\Delta T_{flatness})^2)}$ (step 631A); and b. Determining, as the uncertainty in height above the terrain (ΔHAT), the sum of (i) the uncertainty in height above a reference altitude (ΔRA), and (ii) the uncertainty in terrain height above the reference altitude ΔT, $\Delta RA+A+\sqrt{(B\times(\Delta T_{accuracy})^2+C\times(\Delta T_{flatness})^2)}=\Delta HAT$ (step 632A).

By way of example, a system with one or more components for performing (e.g., that perform, or are configured, adapted, or operable to perform) different steps of the processes depicted in FIG. 6A, in accordance with some embodiments, includes the following: Steps 631A-632A (performed on the mobile device, a computer, or a server, where ΔRA and ΔT components, and the offset and scale parameters A, B, C are available to the mobile device, computer, or server and stored in a database or on a storage device).

Figure 6B:
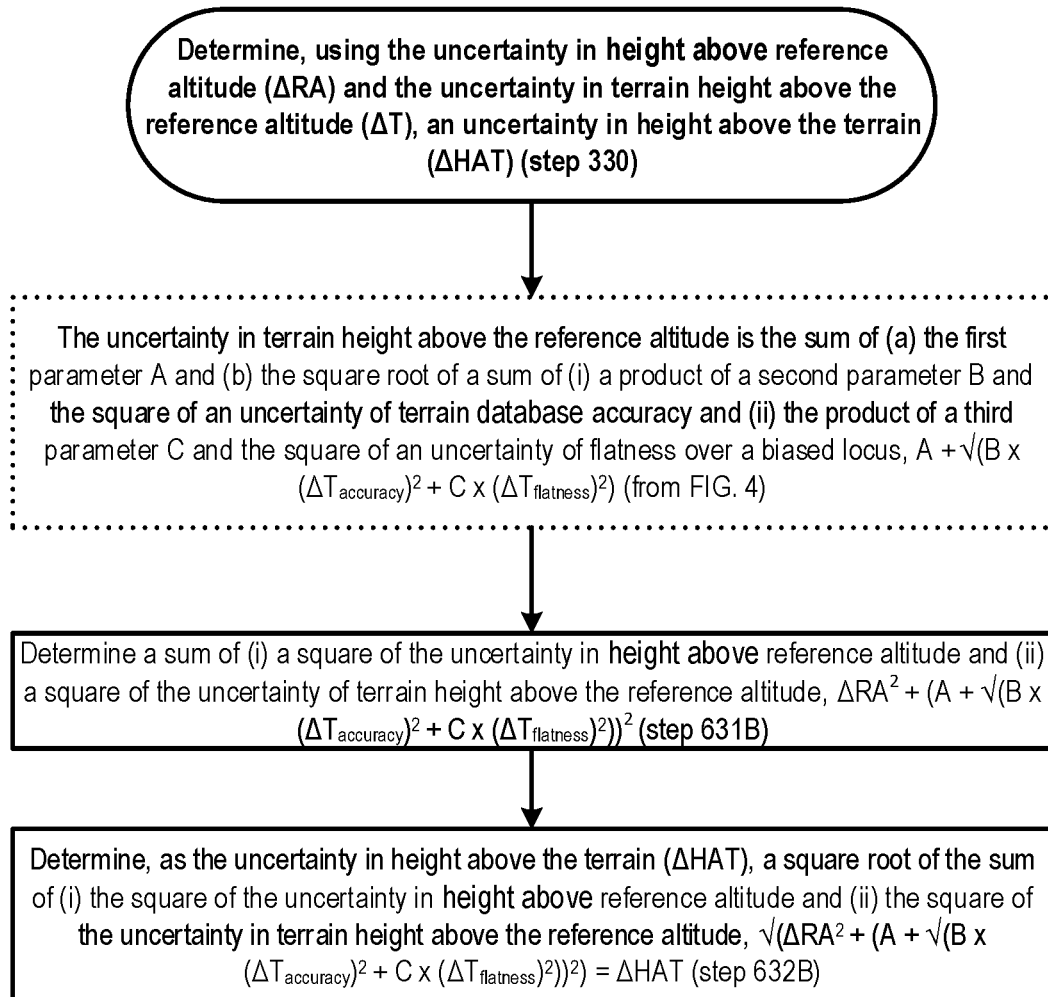

The process shown in FIG. 6B for determining, using an uncertainty in height above a reference altitude and an uncertainty in terrain height above the reference altitude (ΔT), an uncertainty in height above the terrain, in accordance with some embodiments, includes the following steps:

a. Determining a sum of (i) a square of the uncertainty in height above a reference altitude (ΔRA) and (ii) a square of the uncertainty in terrain height above the reference altitude, $\Delta RA^2+(A+\sqrt{(B\times(\Delta T_{accuracy})^2+C\times(\Delta T_{flatness})^2)})^2$ (step 631B); and b. Determining, as the uncertainty in height above the terrain (ΔHAT), a square root of the sum of (i) the square of the uncertainty in height above a reference altitude and (ii) the square of the uncertainty in terrain height above the reference altitude, $\sqrt{(\Delta RA^2+(A+\sqrt{(B\times(\Delta T_{accuracy})^2+C\times(\Delta T_{flatness})^2)})^2)}=\Delta HAT$ (step 632B).

By way of example, a system with one or more components for performing (e.g., that perform, or are configured, adapted, or operable to perform) different steps of the processes depicted in FIG. 6B includes the following: Steps 631B-632B (performed on the mobile device, a computer or a server, where ΔRA and ΔT components, and the offset and scale parameters A, B, C are available to the mobile device, computer, or server and stored in a database or on a storage device).

As noted above, FIG. 7A through FIG. 7E each depict a different process for determining uncertainty in terrain database accuracy for use in determining an uncertainty in height of terrain above a reference altitude (step 421 of FIG. 4), in accordance with some embodiments.

Figure 7A:
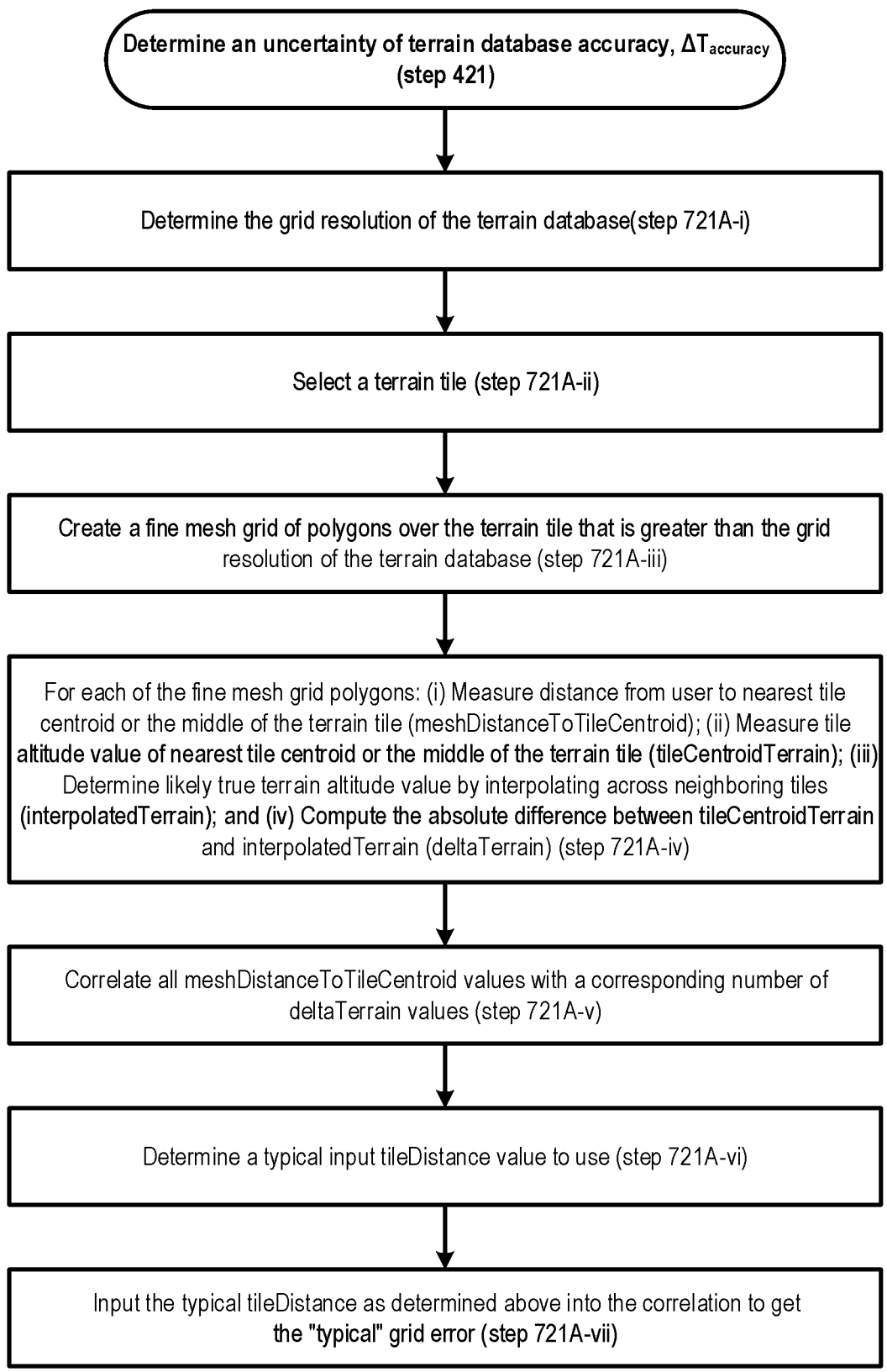
FIG. 7A through FIG.

The process shown in FIG. 7A determines estimated gridding error, and includes the following steps:

a. Determining the grid resolution of the terrain database—e.g., by checking with the documentation of the terrain database, or by measuring the distance between neighboring tiles (step 721A-i);

b. Selecting a terrain tile (step 721A-ii);

c. Creating a fine mesh grid over the terrain tile having a greater resolution than the grid resolution of the terrain database—e.g., if the grid resolution is 10 m by 10 m, then the fine mesh grid resolution can be less than 10 m by 10 m, such as 1 m by 1 m to make 100 sub polygons (e.g., squares, rectangles, hexagons, trapezoids, etc.) (step 721A-iii);

d. For each of the fine mesh grid polygons: (i) Measuring a distance from a center or centroid of the fine mesh grid polygon to a nearest tile centroid or the middle of the terrain tile (meshDistanceToTileCentroid); (ii) Determining a tile altitude value of a nearest tile centroid or the middle of the terrain tile (tileCentroidTerrain); (iii) Determining a likely true terrain altitude value by interpolating across neighboring tiles—e.g., interpolate/fit a 2D polynomial surface like a bilinear surface to the nearest tiles (for example, 4 or 9), store coefficients for a fitted 2D polynomial surface, determining the fine mesh grid terrain altitude values from the interpolated surface using the fine mesh grid location as an input argument to the surface (interpolatedTerrain); and (iv) Computing the absolute difference between tileCentroidTerrain and interpolatedTerrain (deltaTerrain) (step 721A-iv);

e. Correlating all meshDistanceToTileCentroid values with a corresponding number of deltaTerrain values—e.g., 100 meshDistanceToTileCentroid values with 100 deltaTerrain values, where the correlation can be a linear fit (step 721A-v);

f. Determining a typical input tileDistance value to use—e.g., in the best case, the mobile device is always located directly on the centroid of the terrain tile (tileDistance=0), and the worst case is the mobile device is located on the corner of the terrain tile $$\left(tileDistance = \frac{\text{terrain resolution}}{2} \times \sqrt{2}\right),$$

so any value between these two can be used, such as a value halfway between these, for example, so that $$\left(tileDistance = \frac{\text{terrain resolution}}{4} \times \sqrt{2}\right)(\text{step } 721A-vi);$$

and g. Inputting a typical tileDistance as determined above into the correlation to get the "typical" grid error—e.g., for a 6 m typical tileDistance on a 10 m×10 m terrain grid, derive a 0.9 m terrain grid error (step 721A-vii).

Figure 7B:
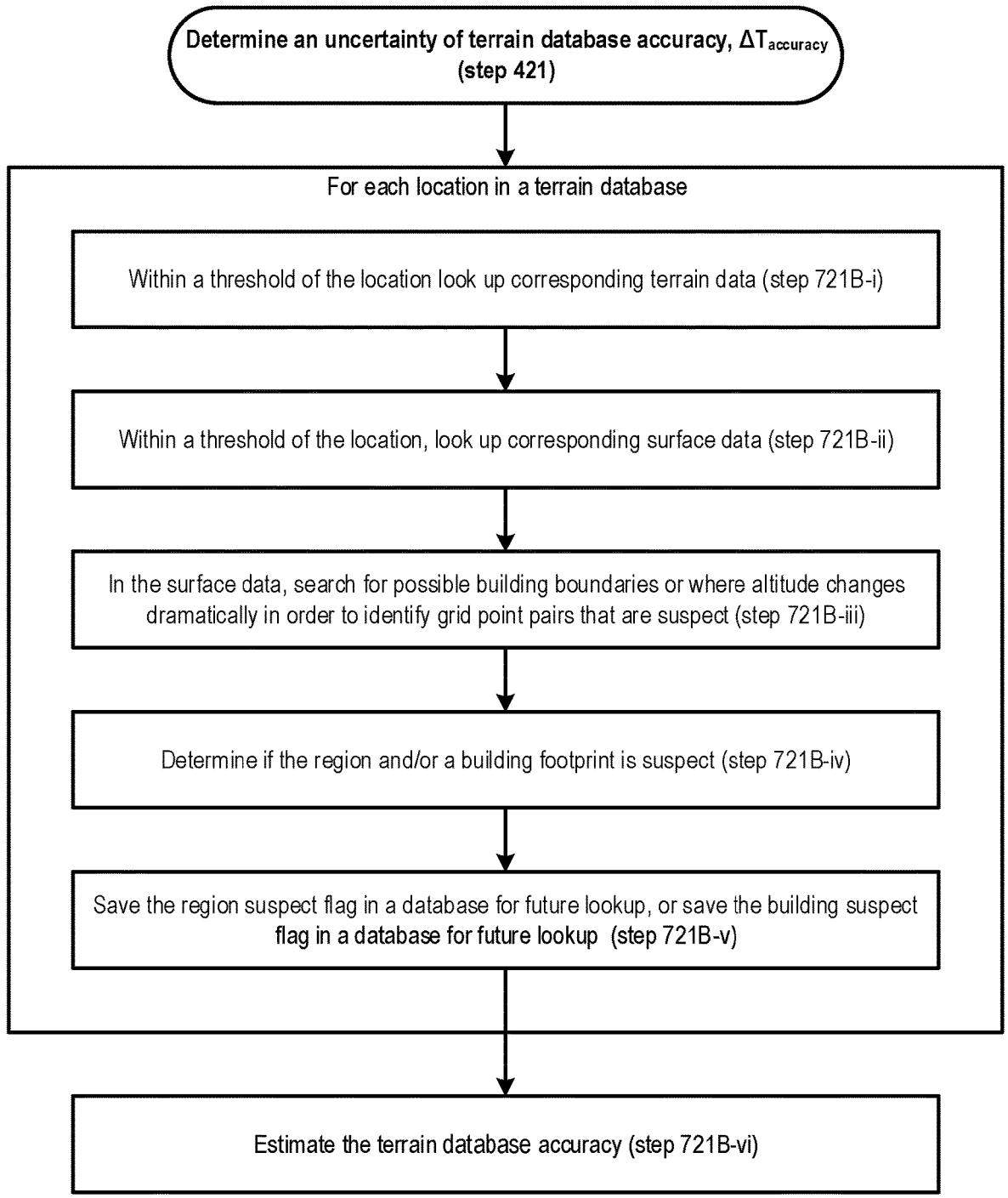
FIG. 7E each depict a different process for determining uncertainty in terrain database accuracy for use in determining an uncertainty in height of terrain above a reference altitude, in accordance with some embodiments.

The process shown in FIG. 7B determines manmade structure removal artifact error relative to the terrain database. Terrain is often determined by surface maps of the Earth, and manmade structures (buildings, bridges, etc.) are removed using a known algorithm. A determination as to how accurate the terrain database is with structures removed can be made using the following steps, in accordance with some embodiments:

a. For each location in a terrain database (e.g., Lat/Lon from a grid, list of addresses, or other identifying information):
   (i) Within a threshold of the location—e.g., a circle of radius R meters or some other shape centered on the location—retrieving corresponding terrain data (step 721B-i);
   (ii) Within a threshold of the location (e.g., a circle of radius R meters or some other shape centered on the location), retrieving corresponding surface data (step 721B-ii);
   (iii) In the surface data, searching for possible building boundaries or where altitude changes dramatically to identify grid point pairs that are suspect by: (a) determining all, or multiple, possible combinations of neighboring grid points; (b) for all neighboring grid points, measuring the difference in altitude between the two grid points, and if the magnitude of the difference in altitude exceeds some threshold (e.g., 5 m), flagging such two grid points as suspect, which is intended to trace building footprints since a building height will exceed the ground by some threshold) (step 721B-iii);
   (iv) Determining if the region and/or a building footprint is suspect by (a) for all suspect grid point pairs, measuring the terrain altitudes at the corresponding grid points, and measuring the difference in altitude between the two grid points; (b) if a determination is made that the magnitude of the difference in altitude exceeds some threshold (e.g., 2 m), then increasing an artifact counter by 1, which is a way of tracing regions where the underlying terrain may not have the artifact removed well since one would expect a smooth transition across building boundaries, not a jagged transition; (c) dividing the artifact counter value by the number of suspect tile pairs to get an artifact ratio; (d) if a determination is made that the artifact ratio exceeds a threshold (e.g., 80%), flagging the region as suspect; and (e) if a building database for the corresponding terrain database is available, if there are building footprints located within the threshold of the location, and if the building footprint can be matched to the grid point pairs, then flagging the building footprint as suspect (step 721B-iv); and
   (v) Saving the region suspect flag in a database for future lookup, or saving the building suspect flag in a database for future lookup (step 721B-v);
b. Estimating the terrain database accuracy as either: (i) the number of suspect regions/buildings in the vicinity of the mobile device—e.g., if one or more are observed in the area, set DTAccuracy (i.e., a value representative of terrain database accuracy) to a fixed number of 3 m; or (ii) the overall number of suspect regions/buildings in the entire database—e.g., if 10% of the entire area of the terrain database are observed, then set DTAccuracy to a fixed number of 3 m (step 721B-vi).

In the example above, surface data is used to trace (or otherwise identify) likely building boundaries (or footprints) in the terrain data. Terrain altitude values across these boundaries are then compared. If the building were perfectly removed from the terrain data, then the altitude inside and outside of the boundaries would be within a small threshold, but if the building were poorly removed from the terrain data, then the altitude difference across the boundaries may be significant (i.e., the building may still remain in the terrain data).

Figure 7C:
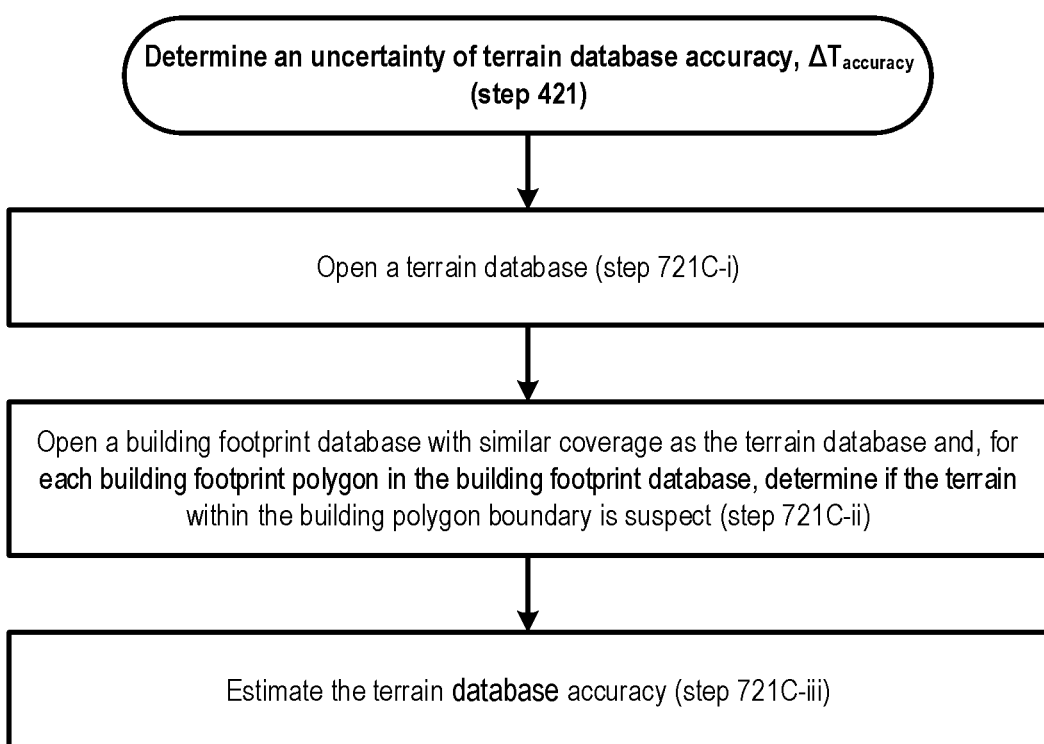

The process shown in FIG. 7C determines manmade structure removal artifact error, and includes the following steps, in accordance with some embodiments:
a. Opening a terrain database (step 721C-i);
b. Opening a building footprint database with similar coverage as the terrain database and, for each building footprint polygon in the building footprint database, determining if the terrain within the building polygon boundary is suspect (step 721C-ii) by:
   (i) Retrieving corresponding altitudes from terrain tiles in the vicinity of the building polygon—e.g., out to some threshold in distance such as 50 m, or some threshold in number of tiles such as 25 tiles—including terrain tiles that fall within the building polygon;
   (ii) Removing terrain tiles that fall within the building polygon;
   (iii) Interpolating over the building polygon, using a 2D polynomial fit in X/Y;
   (iv) Creating a fine mesh of small grid polygons within the building polygon boundary, and for each small grid point, calculating the terrain altitude from the interpolated surface (terrainInterpolated); calculating the terrain altitude from the building database, which is essentially the removed portion (terrainActual); and calculating the difference between terrainActual and terrainInterpolated as deltaTerrain;
   (v) Determining a quality metric—e.g., calculate the cumulative distribution of deltaTerrain or |deltaTerrain|, and measure the 68% value or measure the standard deviation of the deltaTerrain distribution, and if this is above a threshold, such as 5 m, then the terrain within the building polygon boundary is suspect.
c. Estimating the terrain database accuracy as either: (i) the number of suspect regions/buildings in the vicinity of the mobile device—e.g., if one or more are observed in the area, set DTAccuracy to a fixed number of 3 m; or (ii) the overall number of suspect regions/buildings in the entire database—e.g., if 10% of the entire area of the terrain database are observed, then set DTAccuracy to a fixed number of 3 m (step 721C-iii).

In the example above, if a building footprint database does not include the corresponding terrain altitude or the altitude of the ground in the appropriate reference frame (MSL, HAE, etc.), then the altitude of the ground can be measured from the mean/median of corresponding terrain tiles of the terrain database that fall within the building polygon (which were removed in step b-ii above).

Figure 7D:
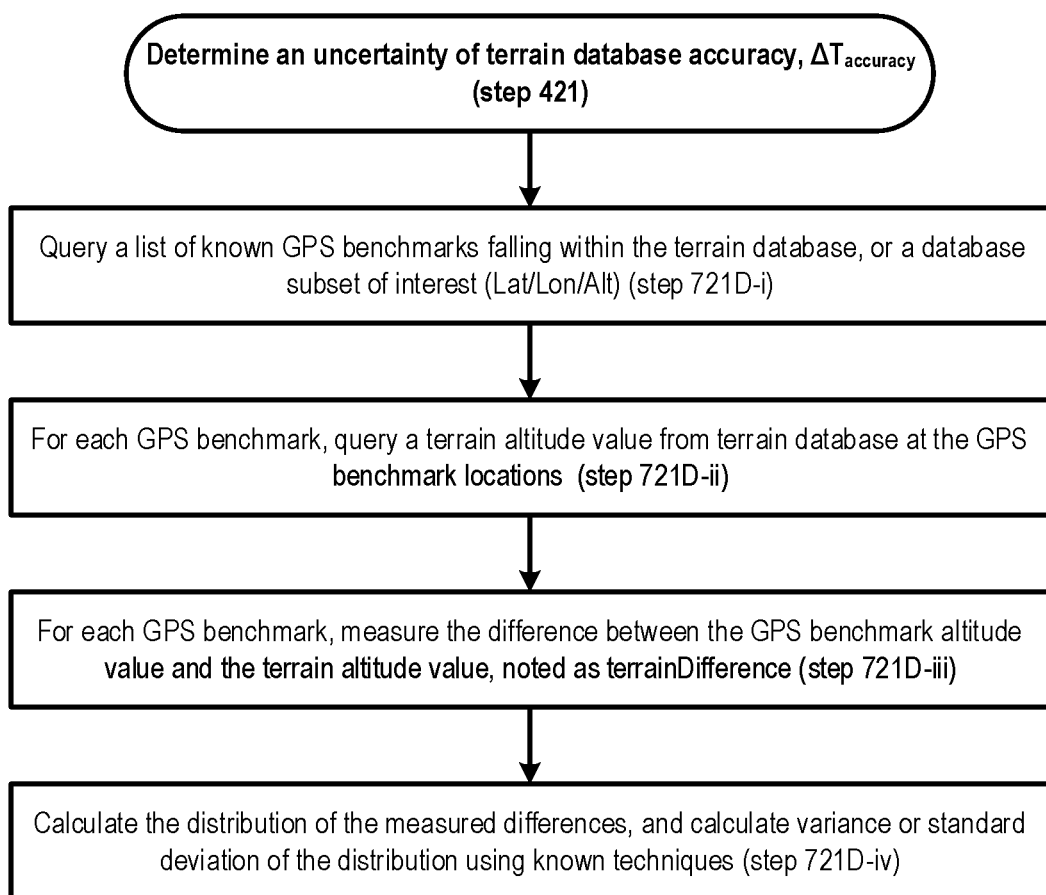

The process shown in FIG. 7D measures the accuracy of a terrain database, and includes the following steps, in accordance with some embodiments:
a. Querying a list of known GPS benchmarks falling within the terrain database, or a database subset of interest (Lat/Lon/Alt) (step 721D-i);
b. For each GPS benchmark, querying a terrain altitude value from terrain database at the GPS benchmark locations (step 721D-ii);
c. For each GPS benchmark, measuring the difference between the GPS benchmark altitude value and the terrain altitude value, noted as terrainDifference (step 721D-iii); and
d. Calculating the distribution of the measured differences, and calculating variance or standard deviation of the distribution (i.e., a deviation from a central tendency of the distribution, such as mean or median or another central tendency) using known techniques (step 721D-iv).

Figure 7E:
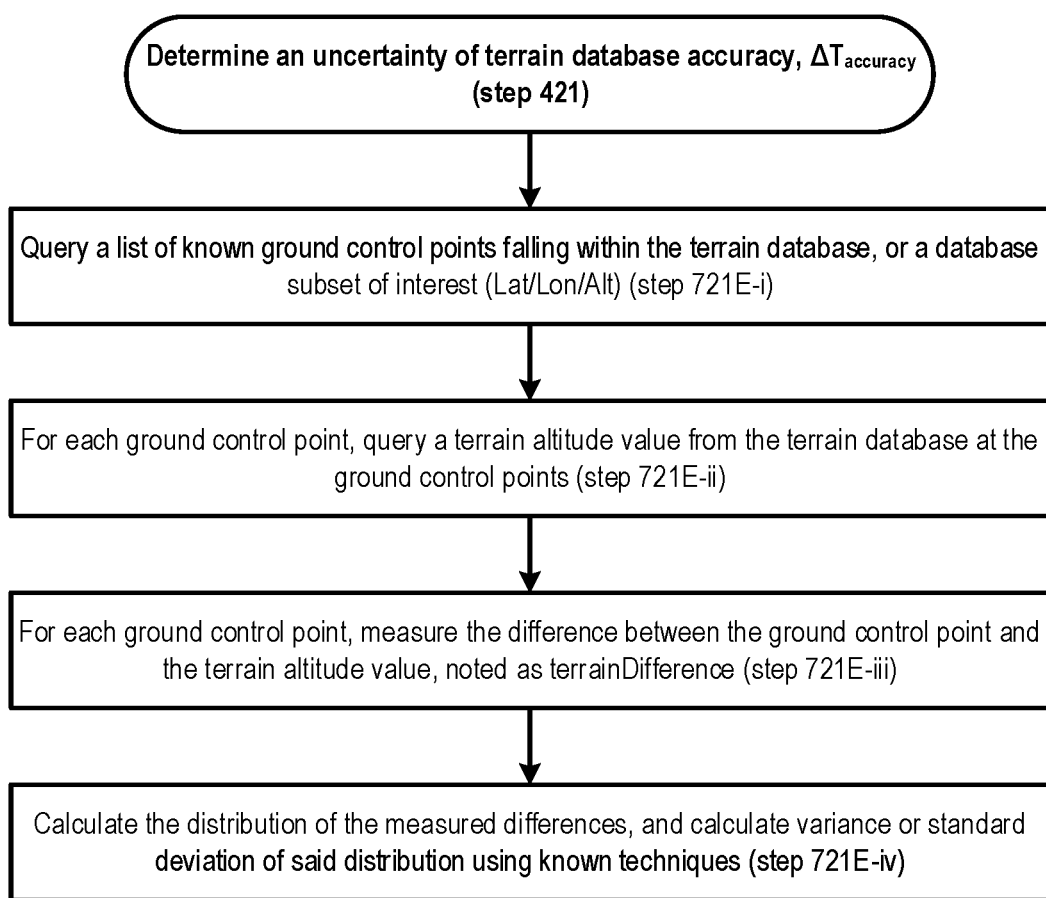

The process shown in FIG. 7E measures accuracy of terrain database, and includes the following steps, in accordance with some embodiments:

a. Querying a list of known ground control points falling within the terrain database, or a database subset of interest (Lat/Lon/Alt) (step 721E-i);

b. For each ground control point, querying a terrain altitude value from the terrain database at the ground control points (step 721E-ii);

c. For each ground control point, measuring the difference between an altitude of the ground control point and the terrain altitude query, noted as terrainDifference (step 721E-iii); and d. Calculating the distribution of the measured differences, and calculate variance or standard deviation (i.e., a deviation from a central tendency of the distribution, such as mean, median, or another central tendency) of said distribution using known techniques (step 721E-iv).

By way of example, a system with one or more components for performing (e.g., that perform, or are configured, adapted, or operable to perform) different steps of the processes depicted in FIG. 7A through FIG. 7E includes the following: a computer, a processor on a mobile phone, and/or a server that has access to the terrain databases, benchmarks, control points, and other information, and are capable of performing the fits and storing the fit coefficients/parameters.

As noted above, FIG. 8 depicts a process for determining uncertainty in flatness over a biased locus of possible positions of a mobile device for use in determining an uncertainty in height of terrain above a reference altitude in step 422 of FIG. 4, in accordance with some embodiments. The process shown in FIG. 8 for determining uncertainty in flatness over a biased locus of possible positions of a mobile device for use in determining an uncertainty in height of terrain above a reference altitude includes the following steps, for a given 2D position and its corresponding 2D confidence, in accordance with some embodiments:

a. Measuring the terrain altitude value at the 2D position (step 822-i);

b. Measuring all terrain altitude values falling within a confidence polygon or a circle (step 822-ii);

c. Subtracting the terrain altitude value at the 2D position from that of all points falling within the confidence polygon or circle, and measuring the absolute value of the distribution noted as "terrainFlatness" (step 822-iii); and d. Calculating an appropriate statistical metric of the terrainFlatness (e.g., 1 sigma value, 2 sigma value, 80%, etc.) noted as DTFlatness using known techniques (step 822-iv).

Figure 8:
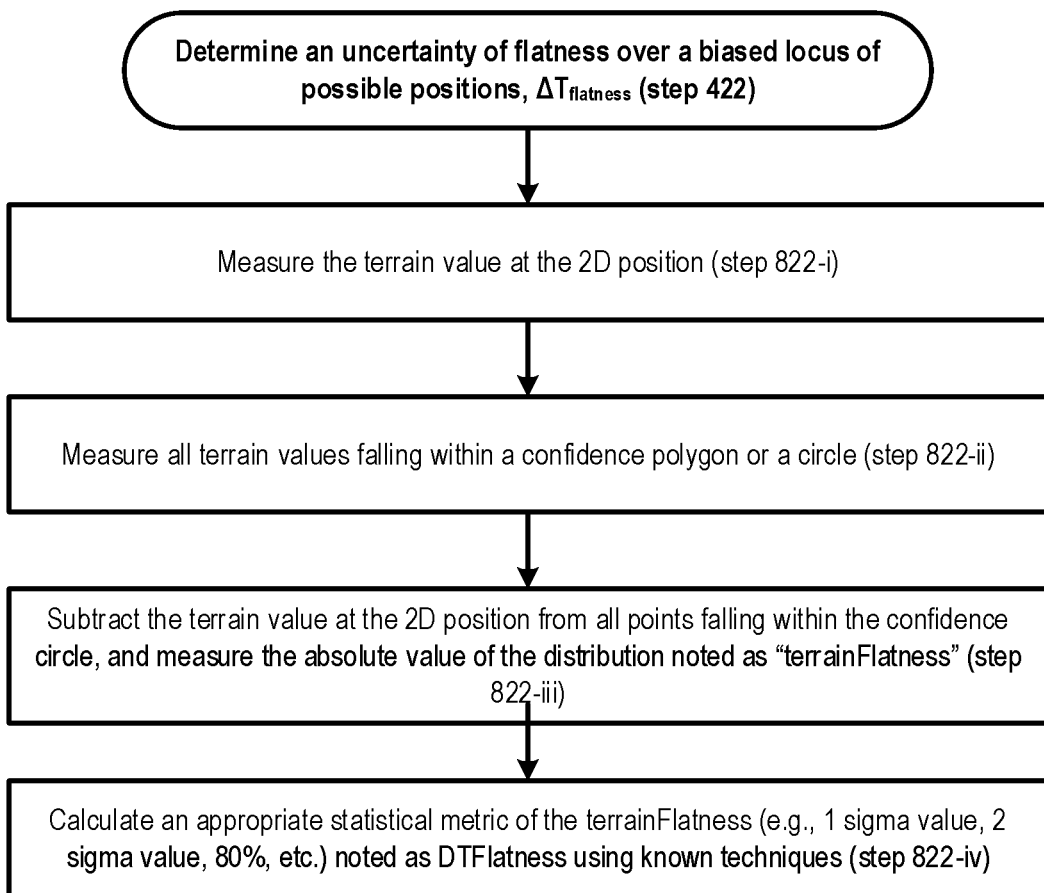
FIG. 8 depicts a different process for determining uncertainty in flatness over a biased locus of possible positions of a mobile device for use in determining an uncertainty in height of terrain above a reference altitude, in accordance with some embodiments.

By way of example, a system with one or more components for performing (e.g., that perform, or are configured, adapted, or operable to perform) different steps of the processes depicted in FIG. 8 includes the following, in accordance with some embodiments: a computer, a processor on a mobile phone, and/or a server that has access to the terrain database and can calculate and store the appropriate terrain flatness metric.

Other Aspects

Any method (also referred to as a "process" or an "approach") described or otherwise enabled by the disclosure herein may be implemented by hardware components (e.g., machines), software modules (e.g., stored in machine-readable media), or a combination thereof. In particular, any method described or otherwise enabled by the disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field-programmable gate array(s), electronic device(s), special-purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable, or adapted to perform or implement operations comprising the steps of any methods described herein are also contemplated herein. Each method described herein that is not prior art represents a specific set of rules in a process flow that provides significant advantages in the field of characterizing height-above-terrain confidence. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any, and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

FIG. 9 illustrates components of a transmitter 901, a mobile device 902, and a server 903. Examples of communication pathways are shown by arrows between components.

By way of example in FIG. 9, each of the transmitters 901 may include: a mobile device interface 11 for exchanging information with a mobile device (e.g., antenna(s) and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example in FIG. 9, the mobile device 902 may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 (such as barometers and temperature sensors) for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure from the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example in FIG. 9, the server 903 may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. No. 9,057,606, issued Jun. 16, 2015. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

The invention claimed is:

1. A method, comprising:
   determining, at a mobile device or a server, an uncertainty in height above a reference altitude;
   determining, at the mobile device or a server, an estimated 2D position of the mobile device;
   determining, at the mobile device or a server, an uncertainty in terrain height above the reference altitude using the estimated 2D position; and
   determining, at the mobile device or a server, an uncertainty in height above terrain, of the mobile device, using the uncertainty in height above the reference altitude and the uncertainty in terrain height above the reference altitude.

2. The method of claim 1, wherein determining an uncertainty in height above a reference altitude comprises:
   determining a first error value representative of an error associated with a pressure sensor of the mobile device;
   determining a second error value representative of an error associated with a reference pressure sensor; and
   determining the uncertainty in height above the reference altitude using the first error value and the second error value.

3. The method of claim 1, wherein determining an uncertainty in height above terrain comprises:
   determining a sum of the uncertainty in height above the reference altitude and the uncertainty in terrain height above the reference altitude; and
   using the sum as the uncertainty in height above terrain.

4. The method of claim 1, wherein determining an uncertainty in height above terrain comprises:
   determining a square of the uncertainty in height above the reference altitude;
   determining a square of the uncertainty in terrain height above the reference altitude;
   determining a sum of the square of the uncertainty in height above the reference altitude and the square of the uncertainty in terrain height above the reference altitude;
   determining a square root of the sum; and
   using the square root as the uncertainty in height above terrain.

5. The method of claim 1, wherein determining an uncertainty in terrain height above the reference altitude comprises:
   identifying an offset value representing an offset that models confidence of terrain uncertainty in excess of uncertainty in terrain database accuracy of a terrain database and the uncertainty in terrain flatness over a locus of possible 2D positions using the estimated 2D position;
   identifying a first scaling factor for weighting a term derived from the uncertainty in terrain database accuracy;
   identifying a second scaling factor for weighting a term derived from the uncertainty in terrain flatness over the locus of possible 2D positions;
   determining a first product of the first scaling factor and a square of the uncertainty in terrain database accuracy;
   determining a second product of the second scaling factor and a square of the uncertainty in terrain flatness over the locus of possible 2D positions;
   determining a first sum of the first product and the second product;
   determining a square root of the first sum;
   determining a second sum of the offset value and the square root; and
   using the second sum as the uncertainty in terrain height above the reference altitude.

6. The method of claim 1, wherein determining the uncertainty in terrain height above the reference altitude comprises:
   determining, at the mobile device or a server, an uncertainty in terrain database accuracy of a terrain database using the estimated 2D position;
   determining, at the mobile device or a server, an uncertainty in terrain flatness measurement over a locus of possible 2D positions using the estimated 2D position; and
   determining, at the mobile device or a server, the uncertainty in terrain height above the reference altitude using the uncertainty in terrain database accuracy and the uncertainty in terrain measurement over the locus of possible 2D positions.

7. The method of claim 6, wherein determining an uncertainty in terrain database accuracy comprises:
   determining a grid resolution of the terrain database;
   selecting a terrain tile;
   creating a fine mesh grid over the terrain tile having a greater grid resolution than the grid resolution of the terrain database, the fine mesh grid having a plurality of fine mesh grid polygons;
   determining a correlation between i) a distance from a center or centroid of each fine mesh grid polygon to a nearest centroid or middle of the terrain tile and ii) a determined altitude error; and
   determining the uncertainty in terrain database accuracy using the determined correlation.

8. The method of claim 7, wherein determining a correlation between a distance from a center or centroid of each fine mesh grid polygon to a nearest centroid or middle of the terrain tile and a determined altitude error comprises:
   for each fine mesh grid polygon of the plurality of fine mesh grid polygons:
      determining a distance from a center or centroid of the fine mesh grid polygon to a nearest centroid or the middle of the terrain tile;
      determining a tile altitude value of the nearest centroid or the middle of the terrain tile;
      interpolating altitude values across the selected terrain tile and neighboring terrain tiles;
      determining a fine mesh altitude for the fine mesh grid polygon using the interpolated altitude values; and
      determining an absolute difference between the fine mesh altitude for the fine mesh grid polygon and the tile altitude value of the selected terrain tile; and
   correlating i) each of the determined distances from the center or centroid of the fine mesh grid polygon to the nearest centroid or the middle of the terrain tile to ii) the determined absolute differences between the fine mesh altitude for the fine mesh grid polygon and the tile altitude value of the selected terrain tile.

9. The method of claim 8, wherein determining the uncertainty in terrain database accuracy using the determined correlation comprises:
   determining a typical distance from the mobile device to the nearest tile centroid or the middle of the terrain tile;
   determining, using the correlation and based on the determined typical distance, a typical grid error value for the terrain database; and
   determining the uncertainty in terrain database accuracy using the typical grid error value.

10. The method of claim 6, wherein determining an uncertainty in terrain database accuracy comprises:
   for each location in a terrain database:
      within a threshold of the location, retrieving corresponding terrain data;
      within a threshold of the location, retrieving corresponding surface data;
      identifying suspect grid point pairs within the surface data; and
      upon determining, using the identified grid point pairs, that the location is suspect, storing an indication in the terrain database that the location is suspect; and
   determining the uncertainty in terrain database accuracy using the stored indication.

11. The method of claim 10, wherein identifying suspect grid point pairs within the surface data comprises:
   determining a plurality of possible combinations of neighboring grid points;
   for each of the neighboring grid points, determining a difference in altitude between the neighboring grid points; and
   upon determining that a magnitude of the difference in altitude exceeds a threshold value, storing an indication in the terrain database that the neighboring grid points are suspect.

12. The method of claim 6, wherein determining an uncertainty in terrain database accuracy comprises:
   identifying a building footprint database having similar terrain coverage as the terrain database;
   for each building footprint polygon in the building footprint database, determining if a corresponding portion of the terrain of the terrain database is suspect;
   upon determining that a corresponding portion of the terrain of the terrain database is suspect, storing an indication in the terrain database that the corresponding portion of the terrain is suspect; and
   determining the uncertainty in terrain database accuracy using the stored indication.

13. The method of claim 12, wherein determining if a corresponding portion of the terrain of the terrain database is suspect comprises:
   retrieving corresponding altitude values from terrain tiles within a threshold distance of the building footprint polygon;
   removing terrain tiles that fall within the building footprint polygon;
   interpolating altitude values over the building footprint polygon;
   creating a fine mesh of small grid polygons within the building footprint polygon;
   for each of the small grid polygons:
      determining a terrain altitude value using the interpolated altitude values;
      determining a corresponding terrain altitude from the building footprint database; and
      determining a difference between the determined terrain altitude value and the corresponding terrain altitude; and
   determining a quality metric using the differences; and
   upon determining that the quality metric surpasses a threshold value, storing an indication in the terrain database that one or more of the terrain tiles within a threshold distance of the building footprint polygon are suspect.

14. The method of claim 6, wherein determining an uncertainty in terrain database accuracy comprises:
   identifying a plurality of Global Positioning System (GPS) benchmarks corresponding to at least a portion of terrain of the terrain database;
   for each GPS benchmark of the plurality of GPS benchmarks:
      retrieving an altitude value corresponding to that GPS benchmark;
      retrieving a terrain altitude value from the terrain database corresponding to that GPS benchmark; and
      determining a height difference between the altitude value of that GPS benchmark and the terrain altitude value;
   determining a distribution of the height differences;
   determining a deviation from a central tendency of the distribution; and
   determining the uncertainty in terrain database accuracy using the determined deviation from the central tendency of the distribution.

15. The method of claim 6, wherein determining an uncertainty in terrain database accuracy comprises:
   identifying a plurality of ground control points corresponding to at least a portion of terrain of the terrain database;
   for each ground control point of the plurality of ground control points:
      retrieving an altitude value corresponding to that ground control point;
      retrieving a terrain altitude value from the terrain database corresponding to that ground control point; and
      determining a height difference between the altitude value corresponding to that ground control point and the terrain altitude value;
   determining a distribution of the height differences; and
   determining a deviation from a central tendency of the distribution; and
   determining the uncertainty in terrain database accuracy using the determined deviation from the central tendency of the distribution.

16. The method of claim 6, wherein determining an uncertainty in terrain flatness over a locus of possible 2D positions using the estimated 2D position comprises:
   determining a first terrain altitude value corresponding to the estimated 2D position;
   determining a plurality of second terrain values falling within a confidence polygon or circle;
   determining a plurality of height differences between the first terrain altitude value and each second terrain value of the plurality of second terrain values;
   determining a distribution of the height differences;
   determining a deviation from a central tendency of the distribution; and
   determining the uncertainty in terrain database accuracy using the determined deviation from the central tendency of the distribution.

17. A method, comprising:
determining a first error value representative of an error associated with a pressure sensor of a mobile device;
determining a second error value representative of an error associated with a reference pressure sensor;
determining an uncertainty in height above a reference altitude using the first error value and the second error value;
determining, at the mobile device or a server, an estimated 2D position of the mobile device;
determining, at the mobile device or a server, an uncertainty in terrain database accuracy of a terrain database using the estimated 2D position;
determining, at the mobile device or a server, an uncertainty in terrain measurement over a locus of possible 2D positions using the estimated 2D position;
determining, at the mobile device or a server, an uncertainty in terrain height above the reference altitude using the uncertainty in terrain database accuracy and the uncertainty in terrain measurement over the locus of possible 2D positions; and
determining, at the mobile device or a server, an uncertainty in height above terrain, of the mobile device, using the uncertainty in height above the reference altitude and the uncertainty in terrain height above the reference altitude.

18. The method of claim 17, wherein determining an uncertainty in height above terrain comprises:
determining a sum of the uncertainty in height above the reference altitude and the uncertainty in terrain height above the reference altitude; and
using the sum as the uncertainty in height above terrain.

19. The method of claim 17, wherein determining an uncertainty in height above terrain comprises:
determining a square of the uncertainty in height above the reference altitude;
determining a square of the uncertainty in terrain height above the reference altitude;
determining a sum of the square of the uncertainty in height above the reference altitude and the square of the uncertainty in terrain height above the reference altitude;
determining a square root of the sum; and
using the square root as the uncertainty in height above terrain.

* * * * *